(12) United States Patent
Ponnekanti

(10) Patent No.: US 7,515,563 B2
(45) Date of Patent: Apr. 7, 2009

(54) COMMUNICATIONS SYSTEMS

(75) Inventor: Seshaiah Ponnekanti, Middlesex (GB)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/848,932

(22) Filed: Aug. 31, 2007

(65) Prior Publication Data

US 2007/0291870 A1 Dec. 20, 2007

Related U.S. Application Data

(63) Continuation of application No. 10/052,207, filed on Jan. 17, 2002, now Pat. No. 7,420,945.

(30) Foreign Application Priority Data

Feb. 1, 2001 (GB) ................................. 0102574.1

(51) Int. Cl.
*H04Q 7/00* (2006.01)
*H04B 7/216* (2006.01)

(52) U.S. Cl. ..................... 370/334; 370/335; 370/342; 375/130

(58) Field of Classification Search ................ 370/334, 370/335, 342
See application file for complete search history.

(56) References Cited

U.S. PATENT DOCUMENTS

| 5,819,168 | A * | 10/1998 | Golden et al. ................ 455/303 |
| 5,978,365 | A |  11/1999 | Yi |
| 6,061,387 | A |  5/2000 | Yi |
| 6,195,045 | B1 |  2/2001 | Xu et al. |
| 6,301,238 | B1 |  10/2001 | Hagerman et al. |
| 6,317,411 | B1 |  11/2001 | Whinnett et al. |
| 6,340,609 | B1 * |  1/2002 | Hwang et al. ............... 438/151 |
| 6,430,215 | B1 * |  8/2002 | Kinoshita et al. ........... 375/147 |

(Continued)

FOREIGN PATENT DOCUMENTS

| EP | 1003297 | 5/2000 |
| GB | 2353437 | 2/2001 |
| WO | 9935764 | 7/1999 |
| WO | 0041339 | 7/2000 |
| WO | 0051265 | 8/2000 |
| WO | 0067508 | 11/2000 |
| WO | 0201732 | 1/2002 |

OTHER PUBLICATIONS

Guo, et al. "Advanced Base Station Technologies for UTRAN", Electronics & Communication Engineering Journal. pp. 123-131, Jun. 2000.

(Continued)

*Primary Examiner*—Andrew Lee
(74) *Attorney, Agent, or Firm*—Katten Muchin Rosenman LLP

(57) ABSTRACT

Communications systems are disclosed having a transmitting apparatus for transmitting a signal to a receiving apparatus, the transmitting apparatus comprising transmitting means for transmitting a plurality of directional transmission beams to the receiving apparatus via different transmission paths, each transmission beam carrying a transmission signal. The transmitting apparatus may include coding means (58) for coding the transmission signals carried by the transmission beams, the coding means (58) being arranged to code the transmission signal carried by one transmission beam differently from the transmission signal carried by another transmission beam. The transmitting apparatus may receive a feedback signal (122) indicating the quality of the various transmission beams and transmit a data signal only in selected transmission beams. A time advance may be selectively applied to some of the transmission signals so that the transmission signals arrive at a receiving apparatus in time synchronism.

7 Claims, 14 Drawing Sheets

U.S. PATENT DOCUMENTS

| | | | |
|---|---|---|---|
| 6,594,473 | B1 | 7/2003 | Dabak et al. |
| 6,768,913 | B1 | 7/2004 | Molnar et al. |
| 6,788,661 | B1 | 9/2004 | Ylitalo et al. |
| 6,864,839 | B2 | 3/2005 | Hamada et al. |
| 6,891,897 | B1 | 5/2005 | Bevan et al. |
| 7,200,182 | B2 | 4/2007 | Dabak et al. |
| 2001/0033622 | A1 | 10/2001 | Jongren et al. |
| 2001/0048675 | A1* | 12/2001 | Nafie et al. .................. 370/349 |
| 2003/0135799 | A1* | 7/2003 | Doetsch et al. ............. 714/712 |
| 2005/0157683 | A1 | 7/2005 | Ylitalo et al. |
| 2006/0003751 | A1* | 1/2006 | Vo ........................... 455/414.1 |
| 2006/0250960 | A1* | 11/2006 | Ando ......................... 370/233 |

OTHER PUBLICATIONS

Alamouti S M., A Simple Transmit Diversity Technique for Wireless Communications. IEEE Journal on Select Areas in Communications, vol. 16, No. 8 pp. 1451-1458, Oct. 1998.

Raitola, et al. Transmission Diversity in Wideband CDMA, pp. 18-21 IEEE 1999.

Dabak, et al. Space Time Block Coded Transmit Antenna Diversity Scheme for WCDMA, pp. 1-10 VTC 1999.

3rd Generation Partnership Project (3GPP) Technical Specifications, 3G TS 25.214 V3.3.0 Draft (Jun. 2000) pp. 29-30.

Lo, T., et al, "Space-Time Block Coding—From a Physical Perspective", WCNC, IEEE Wireless Communications and Networking Conference, XX, vol. 1, Sep. 21, 1999, pp. 150-153, XP 002163282.

Alamouti S M, "A Simple Transmit Diversity Technique for Wireless Communications:" IEEE Journal on Selected Areas in Communications, IEEE Inc., New York, US, vol. 16. No. 8, Oct. 1998, pp. 1451-1458, XP002100058 ISSN: 0733-8716.

Combined Search and Examination Report dated Jun. 24, 2004 for corresponding British Application GB0412276.8.

Translation of Japanese Office Action dated Nov. 1, 2005 for corresponding Japanese Application 2002-022434.

European Search Report dated May 31, 2002 for corresponding European Application EP 0 225 0455.

* cited by examiner $(U_m)_{p1}$ : High data rate user m, Path 1
$(U_m)_{p2}$ : High data rate user m, Path 2

(a)

(b)

(a)

(b)

COMMUNICATIONS SYSTEMS

The present invention relates to communications systems, and in particular communications systems for use in multi-path, multi-user environments, such as cellular mobile communications systems.

In a cellular mobile communications system, the area to be served by the system is divided into a plurality of cells, each of which is served by a base station. Within each cell, it is necessary for the base station to transmit to each wanted user (i.e. each active mobile unit) in a multi-user and multi-path environment. In order to achieve satisfactory signal detection at low bit error rates, the multi-user interference (MUI), sometimes referred to also as multiple access interference (MAI), must be reduced to an acceptable level.

Code division multiple access (CDMA) is a multiplexing technique which is considered suitable for use in mobile cellular communications systems due to its spectral efficiency (leading to the accommodation of more users) and its relative immunity to interference. In cellular mobile communications systems employing CDMA, each signal to be transmitted from the base station to a mobile unit is spread over a wide bandwidth at the base station using a unique spreading code. Each mobile unit despreads one of the wide bandwidth signals back to the original signal using a replica of the spreading code that was used to spread that signal. Other wide bandwidth signals, which were spread with different spreading codes, are not despread, and thus these signals appear at the mobile unit only as background interference. The spreading codes are generally chosen to be orthogonal, or nearly orthogonal. In this way the transmitted signals themselves are made orthogonal, so that interference between the signals is minimised.

An advantage of CDMA is that signals transmitted to a mobile unit via different transmission paths can be resolved (i.e. detected independently) by the mobile unit, provided the signals have sufficiently large differential time delays. This can allow transmission signals transmitted via different paths to be detected separately at the mobile unit and then combined so as to increase the quality of the signals. However, differential time delays between transmission signals received by a mobile unit via different transmission paths can lead to interference between those signals. The increased interference may be due to signals transmitted to the same mobile unit via different transmission paths interfering with each other, or signals transmitted to different mobile units interfering with each other (MUI).

In an article by Y. J. Guo et al entitled "Advanced base station technologies for UTRAN", Electronics & Communications Engineering Journal, June 2000, the entire content of which is incorporated herein by reference, it is proposed to employ adaptive antennas at base stations to form directional transmission beams for each user according to its location. Using an adaptive antenna, a relatively narrow transmission beam pointing at the wanted user and with nulls in the direction of strong interferers can be produced, so that MUI experienced by each user can be reduced.

The system proposed by Guo et al is effective in reducing the MUI experienced by each user. However, where two paths with a wide angular separation exist between the base station and a mobile unit, either the transmission beam must be broad enough to encompass both of the paths, or one of the paths must be excluded from the transmission beam, which may reduce the effectiveness of the system. Furthermore, the proposed system does not solve the problem of differential time delays leading to interference between the signals transmitted to the same user via the various paths.

It is therefore desirable to provide a system which overcomes the problems mentioned above. In particular it is desirable to provide a system in which interference between signals transmitted to a user via different transmission paths is reduced.

According to a first aspect of the present invention there is provided a transmitting apparatus for transmitting a signal to a receiving apparatus, comprising:

transmitting means for transmitting a plurality of directional transmission beams to the receiving apparatus via different transmission paths, each transmission beam carrying a transmission signal representing the signal to be transmitted; and coding means for coding the transmission signals carried by the transmission beams;

wherein the coding means is arranged to code the transmission signal carried by one transmission beam differently from the transmission signal carried by another transmission beam.

By transmitting a plurality of directional transmission beams to the receiving apparatus via different transmission paths, and arranging the coding means to code the transmission signal carried by one transmission beam differently from the transmission signal carried by another transmission beam, interference between the transmission signals may be reduced.

For example, by appropriate choice of the coding applied to the various transmission signals, the cross-correlation between the transmission signals may be reduced, which may reduce the interference between the signals. Thus the coding means may be arranged to code the transmission signals such that the cross-correlation between the transmission signals is lower than would be the case if different coding were not employed.

In one example the coding means is arranged to apply different error protection codes, such as different channel codes, to the transmission signals. For example, the coding applied by the coding means may be one or more of convolution coding, turbo coding, block coding and interleaving.

In another example the coding means is arranged to apply space-time coding to each of the transmission signals. In this case the coding means may be arranged such that a first transmission signal comprises two sequential symbols and a second transmission signal comprises the two symbols in reverse order. In this way the same symbol is transmitted via different transmission paths at different times, which may reduce the effect of fading of the transmission paths, or of bursts of interference. One of the symbols in one of the transmission signals may be the complex conjugate of the corresponding symbol in the other transmission signal, and one of the symbols in one of the transmission signals may be the inverse of the complex conjugate of the corresponding symbol in the other transmission signal. If the transmission signals are coded in this way, by appropriate processing of the received transmission signals, the effect of differential time delays between the transmission signals can be reduced or cancelled.

Alternatively or in addition the coding means may be arranged to apply a different spreading code and/or a different scrambling code to each of the transmission signals, which may improve the quality of the signal obtained by the receiving apparatus.

Preferably, transmission beams are allocated dynamically to transmission paths as new transmission paths appear and old transmission paths disappear. Thus the apparatus may further comprise detecting means for detecting the presence of transmission paths between the transmitting apparatus and the receiving apparatus, and allocating means for allocating transmission beams to at least some of the transmission paths detected by the detecting means. The detecting means may detect the presence of transmission paths, for example, based on the presence of signals which are received by the transmitting apparatus from the receiving apparatus.

If the transmitting apparatus and the receiving apparatus move relative to each other, then the directions of the transmission paths may change. Thus the apparatus may further comprise estimating means for estimating the directions of the transmission paths, and adjusting means for adjusting the directions of transmission of the transmission beams based on the directions estimated by the estimating means.

In operation, the amplitude of a received signal may fluctuate due to transmission conditions. For example, scattering of radio waves may lead to different versions of a transmission signal arriving at the receiver with different delays. Depending on the relative delays, the scattered waves may interfere constructively or destructively, leading to an increase or a decrease in the amplitude of the received signals. The wavelength of the transmission signal determines whether the scattered waves interfere constructively or destructively.

A reduction in the amplitude of a received signal is referred to as fading. If a transmission signal has faded, then it may be preferable to suspend transmission of that transmission signal for the duration of the fade, so as to reduce interference to other transmission signals. One way of determining whether a transmission signal has faded would be to monitor a corresponding reception signal that was transmitted via the same transmission path, but in the opposite direction, to determine if that reception signal had faded. However, if the reception signal is at a different frequency to the transmitted signals, then the reception signals may be faded while the transmission signal is not, and vice versa. Thus it may not be appropriate to suspend transmission of a transmission signal on the basis of a corresponding reception signal.

In an embodiment of the invention, the above problem is overcome by receiving a feedback signal indicating the quality of the various transmission paths, and suspending transmission on a transmission path if it is judged from the feedback signal that that transmission path has faded. Thus the apparatus may further comprise receiving means for receiving from the receiving apparatus a feedback signal indicating the quality of the transmission beams, and selecting means for selecting at least some of the transmission beams based on the feedback signal, the transmitting means being arranged to transmit a transmission signal representing the signal to be transmitted only in the transmission beams selected by the selecting means. The selecting means may be arranged to compare, for each transmission beam, a measure of the quality of that beam (derived from the feedback signal) with a threshold value, and to select those transmission beams with a quality measure above the threshold. Alternatively, the selecting means may be arranged to compare the various quality measures with each other and to select one or more transmission beams with the best relative quality. A combination of the two approaches may be used, with the selecting means selecting the best of those transmission beams with a quality measure above a threshold.

In the above embodiment, preferably the transmitting means is arranged to transmit a control signal in a transmission beam not selected by the selecting means. By transmitting such a control signal, it is possible to continue to monitor the quality of the transmission path, so that if fading of the transmission path stops, transmission on that transmission path may be resumed.

As discussed above, the transmission signals transmitted via different transmission paths may arrive at the receiving apparatus with differential time delays. If the signals have been coded using scrambling codes (so that transmission takes place using CDMA) then orthogonality between the signals may be reduced due to the differential time delays. This loss of orthogonality may be reduced by arranging the transmission signals to arrive at the receiving apparatus substantially in time synchronism. This may be achieved by adjusting the relative timing of the signals. Thus the apparatus may further comprise time adjusting means for adjusting the relative timing of at least two transmission signals such that the two transmission signals transmitted via different transmission paths arrive at the receiving apparatus substantially in time synchronism. For example, one or more of the transmission signals may be time advanced by the appropriate amount, or one or more of the transmission signals may be time delayed by the appropriate amount, or a combination of time advance and time delay may be used. Such a selective time adjustment mechanism may also be used to improve signal quality in non-CDMA systems.

A receiving apparatus corresponding to the transmitting apparatus described above may be provided, and thus in a second aspect of the invention there is provided a receiving apparatus for receiving a plurality of transmission signals and outputting a combined signal based on the plurality of transmission signals, comprising:

receiving means for receiving the plurality of transmission signals carried in respective directional transmission beams via respective transmission paths; and decoding means for decoding the plurality of transmission signals;

wherein the decoding means is arranged to decode one transmission signal differently from another transmission signal.

The decoding means may be arranged to decode signals which have been coded using different convolution codes, or the decoding means may be arranged to decode signals which have been coded using different turbo codes. The apparatus may further comprise combining means for combining signals decoded by the decoding means to yield the output signal.

The decoding means may be arranged to decode signals which have been space-time coded. For example, as was discussed above, the same symbol may have been transmitted via different transmission paths at different times, and one of the symbols in one of the transmission signals may be the complex conjugate of the corresponding symbol in the other transmission signal, and one of the symbols in one of the transmission signals may be the inverse of the complex conjugate of the corresponding symbol in the other transmission signal. In this case, the decoding means may comprise channel estimating means for estimating channel vectors of the transmission paths, and combining means for combining the received transmission signals with the channel vectors estimated by the channel estimating means to yield an output signal. This may reduce or cancel the effect of differential time delays between the transmission signals.

The decoding means may be arranged to descramble signals which have been scrambled using different scrambling codes and/or to despread signals which have been spread using different spreading codes.

The apparatus may further comprise means for producing measures of a quality of the transmission beams, means for producing a feedback signal based on the measures of the quality of the transmission beams, and means for transmitting the feedback signal from the receiving apparatus to the transmitting apparatus.

Analogous method aspects are also provided, and thus in a third aspect of the invention there is provided a method of transmitting a signal from a transmitting apparatus to a receiving apparatus, comprising:

coding a plurality of transmission signals representing the signal to be transmitted, each transmission signal being coded differently; and transmitting a plurality of directional transmission beams from the transmitting apparatus to the receiving apparatus via different transmission paths, each transmission beam carrying a differently coded transmission signal.

A corresponding receiving method is also provided, and thus in a fourth aspect of the invention there is provided a method of receiving transmission signals, comprising:

receiving a plurality of transmission signals carried in respective directional transmission beams via respective transmission paths;

decoding the plurality of transmission signals, one transmission signal being decoded differently from another transmission signal; and outputting a combined signal based on the plurality of transmission signals.

As discussed above, the transmission of data signals in transmission beams which have faded may be suspended to avoid causing interference to other transmission beams. To determine which transmission beams have faded, a feedback signal indicating the quality of the transmission beams may be sent from the receiving apparatus to the transmitting apparatus.

The above feature may be provided independently and thus, according to a fifth aspect of the invention, there is provided a transmitting apparatus for transmitting a data signal to a receiving apparatus, comprising:

transmitting means for transmitting a plurality of directional transmission beams to the receiving apparatus via different transmission paths;

receiving means for receiving from the receiving apparatus a feedback signal indicating a quality of the transmission beams; and selecting means for selecting at least one of the plurality of transmission beams based on the feedback signal;

wherein transmitting means is arranged to transmit the data signal only in those transmission beams selected by the selecting means.

Preferably the selecting means is arranged to determine whether the transmission beams have faded and to select transmission beams which are not faded. For example, the selecting means may be arranged to compare, for each transmission beam, a measure of the quality of that beam (derived from the feedback signal) with a threshold value, and to select those transmission beams with a quality measure above the threshold. Alternatively, the selecting means may be arranged to compare the various quality measures with each other and to select one or more transmission beams with the best relative quality, or a combination of the two approaches may be used.

If a transmission beam is likely to cause significant interference to other transmission beams, then it may be preferred not to transmit a data signal in that transmission beam even if the transmission beam has not faded. Such a situation may arise, for example, if the data signal is a high data rate signal and other transmission beams are to be transmitted in similar directions. Thus the selecting means may be arranged to select transmission beams additionally based on the relative powers and/or directions of the transmission beams.

The transmitting means may be arranged to transmit a control signal in a transmission beam not selected by the selecting means, which control signal is for use in measuring the quality of the transmission beam. Such a control signal may be of relatively low power, and thus cause little interference to other signals.

The feedback signal may comprise a number of feedback symbols equal to the number transmission beams, and each feedback symbol may indicate whether one of the transmission beams has faded. Each feedback symbol may be, for example, a codeword, or simply one or more bits. Alternatively the feedback signal may comprise measures of the quality of each of the transmission beams. In the latter case the receiving means may be arranged to receive the quality measures for different transmission beams at different times on a predetermined time division multiplexing basis.

The apparatus may further comprise means for altering signals to be carried by the transmission beams such that the signals are distinguishable from each other. In this way the receiving apparatus can distinguish between the various transmission beams and thereby obtain a measure of a quality of each of the transmission beams. However, the receiving apparatus may be able to distinguish between various transmission beams, for example, based on different times of arrivals of the corresponding transmission signals.

A corresponding receiving apparatus is also provided, and thus according to a sixth aspect of the invention there is provided a receiving apparatus for receiving signals transmitted by a transmitting apparatus, comprising:

receiving means for receiving a plurality of directional transmission beams transmitted via different transmission paths;

means for producing measures of a quality of the transmission beams;

means for producing a feedback signal based on the measures of the quality of the transmission beams; and means for transmitting the feedback signal from the receiving apparatus to the transmitting apparatus.

The apparatus may be arranged to output a combined signal based on a plurality of received signals. Thus, if the data signal is transmitted via a plurality of different transmission beams, all of the received signals may be combined to produce the combined signal. By combining the received signals in this way, the quality of the signals may be improved.

Preferably the feedback signal is for use in determining whether the transmission beams have faded.

The receiving means may be arranged to receive control signals in each of the transmission beams, and the means for producing quality measures may be arranged to produce measures of the quality of the transmission beams based on measures of the quality of the control signal.

The feedback signal may comprise a number of feedback symbols equal to the number transmission beams, each feedback symbol indicating whether one of the transmission beams has faded. Alternatively the feedback signal may comprise measures of the quality of each of the transmission beams. In the latter case the quality measures for different transmission beams may be transmitted at different times on a predetermined time division multiplexing basis.

The apparatus may further comprising means for distinguishing signals carried by different transmission beams, to allow the qualities of the various transmission beams to be determined.

Analogous method aspects are also provided, and thus in a seventh aspect of the present invention there is provided a method of transmitting a data signal from a transmitting apparatus to a receiving apparatus, comprising:

> transmitting a plurality of directional transmission beams from the transmitting apparatus to the receiving apparatus via different transmission paths;
> receiving the plurality of directional transmission beams;
> producing measures of a quality of the transmission beams;
> producing a feedback signal based on the measures of the quality of the transmission beams;
> transmitting the feedback signal from the receiving apparatus to the transmitting apparatus;
> receiving the feedback signal;
> selecting at least one of the plurality of transmission beams based on the feedback signal; and
> transmitting the data signal only in the selected transmission beams.

As discussed above, the relative timing of the transmission signals may be adjusted such that transmission signals transmitted via different transmission paths arrive at the receiving apparatus substantially in time synchronism. This feature may also be provided independently, and thus according to a eighth aspect of the present invention there is provided a transmitting apparatus for transmitting a plurality of transmission signals, comprising:

> transmitting means for transmitting a plurality of directional transmission beams, each transmission beam carrying a transmission signal; and
> time adjusting means for adjusting the relative timing of at least two transmission signals such that, when the corresponding transmission beams are received at a receiving apparatus via different transmission paths the two transmission signals are substantially in time synchronism.

By arranging the transmission signals to be received substantially in time synchronism, interference between the signals may be reduced.

The time adjusting means may be arranged to adjust the relative timing of the two transmission signals in dependence on a measure of the relative propagation delay of the corresponding transmission paths. The apparatus may further comprise means for measuring the relative propagation delay of the transmission paths. Alternatively, the measure of the relative delay may be sent from the receiving apparatus to the transmitting apparatus, and thus the apparatus may further comprise means for receiving the measure of the relative propagation delay from the receiving apparatus. The receiving apparatus may be, for example, a mobile unit, or some other apparatus which is provided for measuring and feeding back the relative propagation delay.

In one example, the two transmission signals both represent a signal to be transmitted to the receiving apparatus. In another example, one transmission signal represents a signal to be transmitted to the receiving apparatus and the other transmission signal represents a signal to be transmitted to a different receiving apparatus.

The apparatus may further comprise means for selecting transmission signals which are to have their relative timing adjusted, based on the relative directions and/or powers of the corresponding transmission beams. For example, the transmission signals may be selected if the corresponding transmission beams are high power, which may arise, for example, if the transmission signals are high data rate signals. Alternatively, the transmission signals may be selected because one or more of the corresponding transmission beams is transmitted in a direction of high transmission power. This situation may arise due to one high data-rate user or several lower data-rate users transmitting in that direction. By selecting the transmission beams which are to have their relative timing adjusted in this way, interference can be minimised in areas where the most interference would otherwise be caused, which enhances the overall performance of the system.

The apparatus may further comprise means for applying orthogonal spreading and/or scrambling codes to the two transmission signals. In this way the transmission signals can be separated at the receiving apparatus.

The invention extends to corresponding receiving apparatus, and thus in a ninth aspect of the invention there is provided receiving apparatus for receiving signals transmitted by a transmitting apparatus, comprising:

> receiving means for receiving a plurality of directional transmission beams transmitted via different transmission paths, each transmission beam carrying a transmission signal;
> means for measuring a relative propagation delay of the transmission signals;
> means for producing a feedback signal based on a measure of the relative propagation delay; and
> means for transmitting the feedback signal from the receiving apparatus to the transmitting apparatus.

The receiving apparatus may be, for example, a mobile unit, or some other apparatus which is provided for measuring and feeding back the relative propagation delay.

Corresponding method aspects are also provided, and thus in a tenth aspect of the invention there is provided a method of transmitting a plurality of transmission signals, comprising:

> adjusting the relative timing of at least two transmission signals; and
> transmitting a plurality of directional transmission beams, each transmission beam carrying a transmission signal;
> wherein the relative timing of the at least two transmission signals is adjusted such that, when the corresponding transmission beams are received at a receiving apparatus via different transmission paths the two transmission signals are substantially in time synchronism.

Any of the above transmitting apparatuses may further comprising detecting means for detecting the presence of the transmission paths between the transmitting apparatus and the receiving apparatus, and allocating means for allocating transmission beams to at least some of the transmission paths detected by the detecting means. Furthermore, any of the above transmitting apparatuses may further comprise estimating means for estimating the directions of the transmission paths and adjusting means for adjusting the directions of transmission of the transmission beams in dependence on the directions estimated by the estimating means.

Any of the above transmitting apparatuses may further comprise means for applying spreading codes to the transmission signals to enable code division multiple access transmission. Similarly, any of the above receiving apparatuses may further comprising means for despreading transmission signals which have been transmitted using code division multiple access transmission.

Any of the above transmitting apparatuses may further comprising a plurality of beam formers and a plurality of antenna elements for producing the plurality of directional transmission beams.

The invention also extends to a base station for use in a mobile cellular communications system comprising transmitting apparatus in any of the forms described above. The invention also extends to a mobile unit for use in a mobile cellular communications system comprising receiving apparatus in any of the forms described above.

The invention also extends to a communications system comprising transmitting apparatus in any of the forms described above and receiving apparatus in any of the forms described above. The system may comprise more than one receiving apparatus (e.g. mobile units).

In a eleventh aspect of the invention there is provided a transmitting apparatus for transmitting a signal to a receiving apparatus, comprising:

an antenna array;

a transmitter array connected to the antenna array; and a plurality of beam formers connected to the transmitter array, each beam former being operable to receive a transmission signal and to modify the transmission signal, such that the antenna array produces a plurality of directional transmission beams carrying respective transmission signals; and a channel encoder operable to encode each of the transmission signals according to a different code.

In a twelfth aspect of the present invention there is provided a receiving apparatus for receiving a plurality of transmission signals and outputting a combined signal based on the plurality of transmission signals, comprising:

a receiver operable to receive a plurality of transmission signals carried in respective directional transmission beams via respective transmission paths, and to separate the plurality of transmission signals; and a channel decoder for decoding each of the transmission signals differently from the other transmission signals.

In a thirteenth aspect of the invention there is provided a transmitting apparatus for transmitting a data signal to a receiving apparatus, comprising:

an antenna array;

a transmitter array connected to the antenna array;

a plurality of beam formers connected to the transmitter array, each beam former being operable to receive a transmission signal and to modify the transmission signal, such that the antenna array produces a plurality of directional transmission beams carrying respective transmission signals;

a receiver operable to receive from the receiving apparatus a feedback signal indicating a quality of the transmission beams; and a processor programmed to produce the transmission signal, to select at least one of the plurality of transmission beams based on the feedback signal and to insert the data signal only in those transmission signals which correspond to the selected transmission beams.

In a fourteenth aspect of the invention there is provided a receiving apparatus for receiving signals transmitted by a transmitting apparatus, comprising:

a receiver operable to receive a plurality of directional transmission beams transmitted via different transmission paths;

a processor programmed to produce measures of a quality of the transmission beams and to produce a feedback signal based on the measures of the quality of the transmission beams; and a transmitter operable to transmit the feedback signal from the receiving apparatus to the transmitting apparatus.

In a fifthteenth aspect of the invention there is provided a transmitting apparatus for transmitting a plurality of transmission signals, comprising:

an antenna array;

a transmitter array connected to the antenna array;

a plurality of beam formers connected to the transmitter array, each beam former being operable to receive a transmission signal and to modify the transmission signal, such that the antenna array produces a plurality of directional transmission beams carrying respective transmission signals; and a processor programmed to adjust the relative timing of at least two transmission signals such that, when the corresponding transmission beams are received at a receiving apparatus via different transmission paths the two transmission signals are substantially in time synchronism.

In this specification, a directional transmission beam is preferably a transmission beam which has a greater power in one direction than in another direction. The 3 dB beamwidth (i.e. the angular width of the beam where the beam strength is 3 dB below that in the centre of the beam) may be chosen and/or adjusted as required. In one example the 3 dB beamwidth is less than 90°, and preferably less than 60° or less than 45° or less than 30°, although it may be more than any of these values.

Features of one aspect may be applied to any other aspect. Apparatus features may be applied to method aspects and vice versa.

In any of the above aspects the various features may be implemented in hardware, or as software modules running on one or more processors.

The invention also provides computer programs and computer program products for carrying out any of the methods described herein, and computer readable media having stored thereon programs for carrying out any of the methods described herein. A computer program embodying the invention may be stored on a computer-readable medium, or it could, for example, be in the form of a signal such as a downloadable data signal provided from an Internet web site, or it could be in any other form.

Preferred features of the present invention will now be described, purely by way of example, with reference to the accompanying drawings, in which.

OVERVIEW OF A MOBILE CELLULAR COMMUNICATIONS SYSTEM

Figure 1:
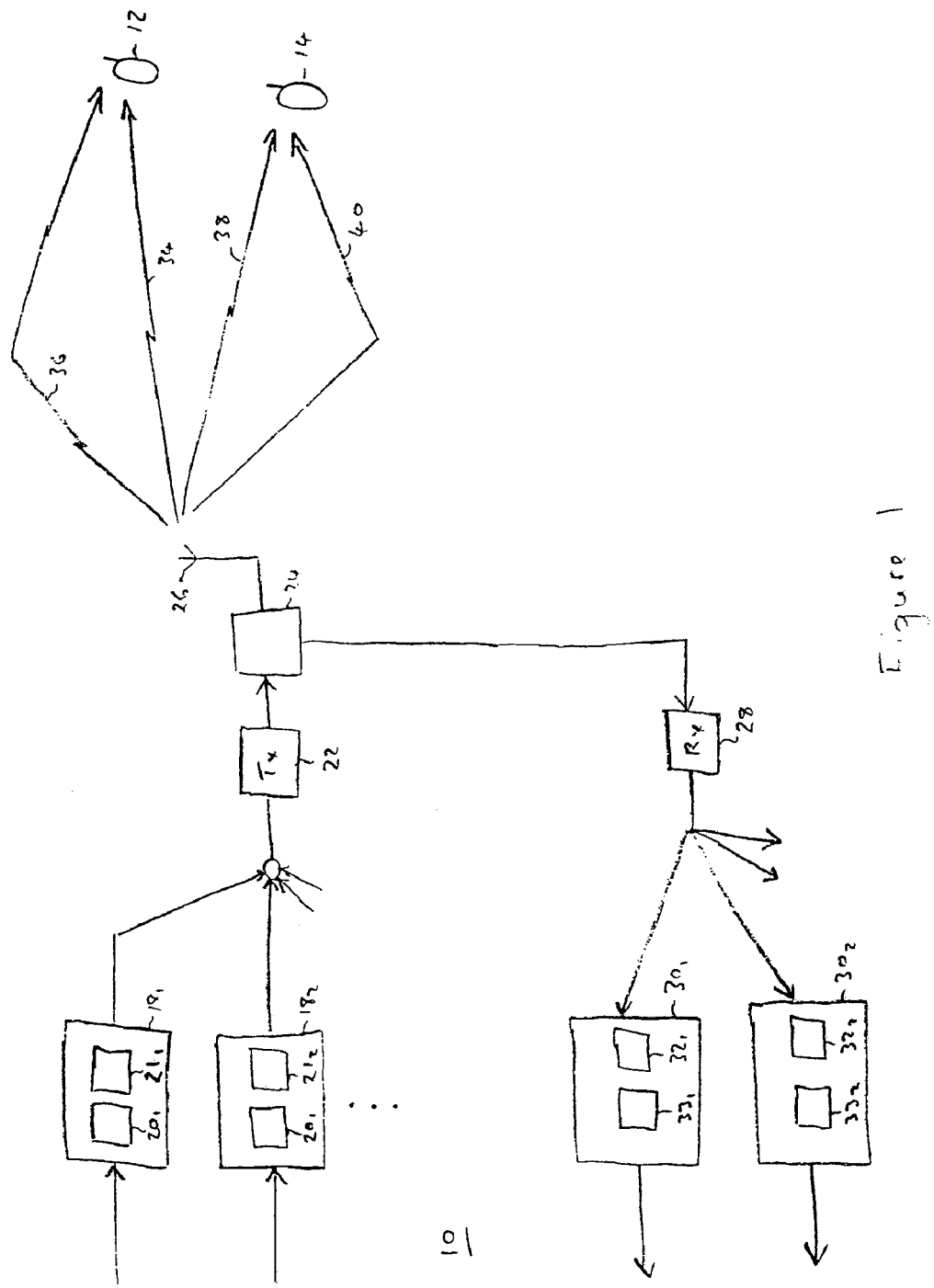
FIG. 1 shows an overview of a mobile cellular communications system.

An overview of a mobile cellular communications system is shown in FIG. 1. The system uses code division multiple access (CDMA) in order to allow different signals to be transmitted in the same frequency band. The system is designed in particular for use with the proposed FDD (Frequency Division Duplexing) mode of the UMTS (Universal Mobile Telecommunications System) Terrestrial Access Network (UTRA) standard. Further details of the proposed UTRA standard may be found in the 3rd Generation Partnership Project (3GPP) Technical Specifications, available from the 3GPP Organisational Partners' Publications Offices, the entire contents of which are incorporated herein by reference, and in "Mobile Radio Networks Networking and Protocols" by Bernhard Walke, ISBN 0-471-97595-8, the entire content of which is incorporated herein by reference.

Referring to FIG. 1, base station 10 transmits signals to and receives signals from a plurality of mobile units 12, 14 which are typically mobile telephones or portable data processing devices. Base station 10 comprises transmission signal processing units $18_1$, $18_2$, transmitter 22, duplexer 24, antenna 26, receiver 28, and reception signal processing units $30_1$, $30_2$. The transmission signal processing units $18_1$, $18_2$ include spreaders $20_1$, $20_2$ and scramblers $21_1$, $21_2$, and the reception signal processing units $30_1$, $30_2$ include descramblers $32_1$, $32_2$ and despreaders $33_1$, $33_2$.

In operation, signals for transmission to each of the mobile units 12, 14 are fed to transmission signal processing units $18_1$, $18_2$. Each of the spreaders $20_1$, $20_2$ in the processing units multiplies the signals for a particular mobile unit by a spreading code which is unique to that mobile unit. Each spreading code is one of a set of orthogonal (or nearly orthogonal) code sequences, consisting of a number of bits belonging to a pseudo-random sequence. By multiplying a signal by the spreading code to form rapidly changing "chips", the signal is spread from a narrow band signal to a wide band signal in a unique way. The orthogonality of the spreading codes means that, when the signals are transmitted, as long as there are no differential time delays between the spread signals, the spread signals will not interfere with each other.

Each of the transmission signals is also scrambled by a scrambling code in the scramblers $21_1$, $21_2$. The scrambling code is a code which is unique to that base station (or base station sector if the area covered by the base station has been divided into sectors) and is used to reduce interference between the signals transmitted by different base stations. In contrast to the spreading codes, the scrambling codes do not form an orthogonal code set. This is because the signals from different base stations are not synchronous, and so it would not be possible to maintain the orthogonality of the codes.

The various spread and scrambled signals are then combined and transmitted by transmitter 22 and antenna 26 for reception by mobile units 12, 14 (downlink transmission).

FIG. 1 illustrates a case where the signal from base station 10 to mobile unit 12 is received at the mobile unit via direct path 34 and reflected path 36, while the signal from base station 10 to mobile unit 14 is received by the mobile unit via direct path 38 and reflected path 40. Typically a number of transmission paths exist between the base station and a mobile unit due to, for example, reflections from large buildings. These transmission paths have different lengths and directions and, accordingly, each mobile unit receives a number of transmission signals having different respective delays and angles of arrival.

At each of the mobile units 12, 14 a descrambler (not shown) descrambles the received signal using a replica of the scrambling code, and a despreader (not shown) corresponding to one of the spreaders $20_1$, $20_2$ at the base station despreads the received signal using a replica of the appropriate spreading code. If the differential delay between the various transmission paths is greater than the chip rate, then the signals received via the various paths can be resolved at the mobile unit, since the despreaders identify them as separate signals. If the differential delay is less than the chip rate, the receiver cannot resolve the various paths, and fading may occur due to destructive interference between two or more phase offset signals.

Each of the mobile units 12, 14 also transmits a transmission signal to the base station 10 (uplink transmission). Each transmission signal is scrambled by a unique scrambling code in order to allow the transmissions from the various mobile units to be discriminated by the base station. In this example, scrambling codes rather than spreading codes are used to distinguish between the various signals in the uplink because the uplink signals are asynchronous, and asynchronous scrambling codes are more effective on average than asynchronous spreading codes. In this example, spreading codes may be used to allow multiple code channels to be assigned to a given user. In alternative embodiments, spreading codes are used in the uplink to distinguish between the various signals.

The signals are received at the base station via antenna 26 and receiver 28 and fed to reception signal processors $30_1$, $30_2$. The descramblers $32_1$, $32_2$ in the processors descramble the received signals and the despreaders $33_1$, $33_2$ despread the received signals to obtain the original narrow-band signals from the various mobile units. Alternatively, a RAKE receiver may be used to receive and then combine signals received via different transmission paths. The received beam patterns may be adapted using beam formers in the receiver. Preferably, the receiving apparatus of the base station is as described in co-pending United Kingdom patent application number 0018859.9 in the name of Fujitsu Limited, the entire contents of which are incorporated herein by reference.

While only two mobile units 12, 14 are shown in FIG. 1, typically a large number of mobile units communicate with base station 10. Also it will be appreciated that one, two or more transmission paths may exist between the base station and a mobile unit, depending on the environment.

In the downlink of the system shown in FIG. 1, a physical channel is identified by its frequency and its spreading code. Data and control information are transmitted using the same physical channel using time-division-multiplexing (TDM). In the uplink, through the use of Quadrature Phase Shift Keying, different information is transmitted on the I-(in phase) and Q-(quadrature) branches, so that in the uplink direction a physical channel is identified by its frequency, spreading code, and relative phase (0 or Π/2). In the uplink, data and control information are transmitted separately in the I- and Q-branches respectively.

Figure 2:
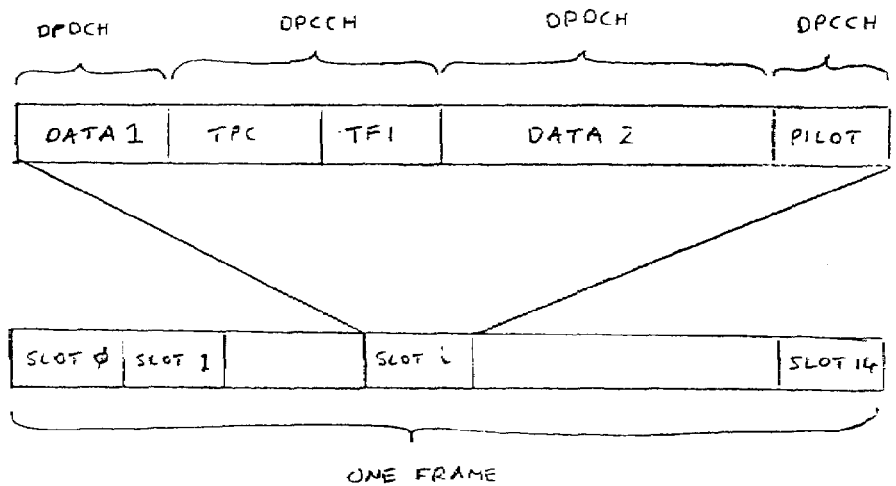
FIG. 2 shows a proposed frame structure of a downlink physical channel.

FIG. 2 shows a proposed frame structure of a downlink physical channel. Referring to FIG. 2, each frame of duration 10 ms is split into 15 slots, each corresponding to one power control period. Each slot comprises a first set of data bits (DATA 1), transmit power control (TPC) bits, transport format indicator (TFI) bits, a second set of data bits (DATA 2), and pilot bits (PILOT). The data bits are used for the transmission of data from the base station 10 to one of the mobile units 12, 14. The power control bits are used to control the transmission power of the mobile unit based on a measure of the strength of the signal received by the base station. The transport format indicator bits (which are optional) are used to describe the instantaneous parameters of the different transport channels on the dedicated physical data channel. The pilot bits are predetermined bits which are used, for example, for channel estimation. The first and second set of data bits in combination form a downlink dedicated physical data channel (DPDCH), while the TPC, TFI and pilot bits in combination form a downlink dedicated physical control channel (DPCCH).

Figure 3:
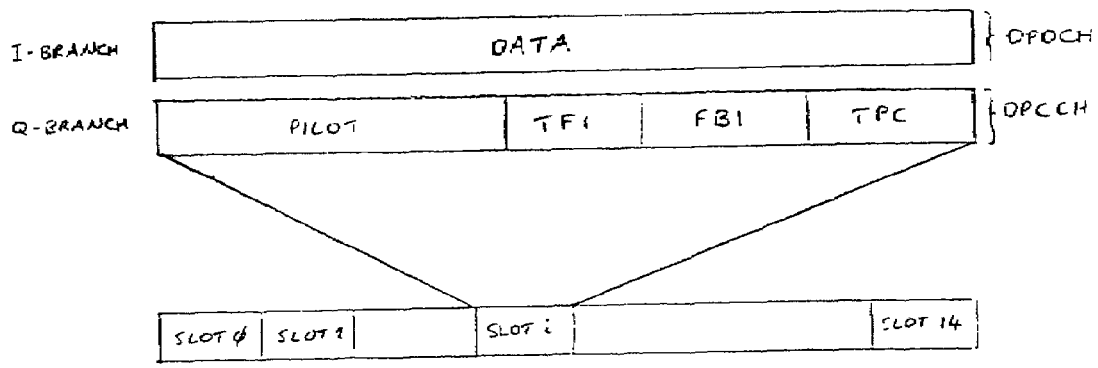
FIG. 3 shows a proposed frame structure of an uplink physical channel.

FIG. 3 shows a proposed frame structure of an uplink physical channel. Referring to FIG. 3, the uplink dedicated physical data channel (uplink DPDCH) and uplink dedicated physical control channel (uplink DPCCH) are I/Q multiplexed within each frame so that the two channels are provided simultaneously. The DPDCH is used to carry data while the DPCCH is used to carry control information. The DPCCH consists of pilot bits (PILOT) for channel estimation, transport format indicator (TFI) bits (optional), feedback information (FBI) bits and transmit power control (TPC) bits. The feedback information bits are used to support techniques which require feedback between the mobile unit and the base station.

FIRST EMBODIMENT

In the system shown in FIG. 1, although signals having differential delays of greater than the chip rate may be resolved at the receiver, the fact that the signals arrive at different times leads to interference between the signals. In addition, the orthogonality between signals sent to different mobile units may be reduced, which may increase the MUI.

In a first embodiment of a communications system, the fact that a plurality of transmission paths may exist between the base station and a mobile unit is exploited by forming a directional transmission beam for each transmission path and transmitting a separate transmission signal in each transmission beam. This technique is referred to herein as path diversity. Each of the transmission signals is coded differently using a space-time diversity scheme in order to reduce interference between the signals.

Figure 4:
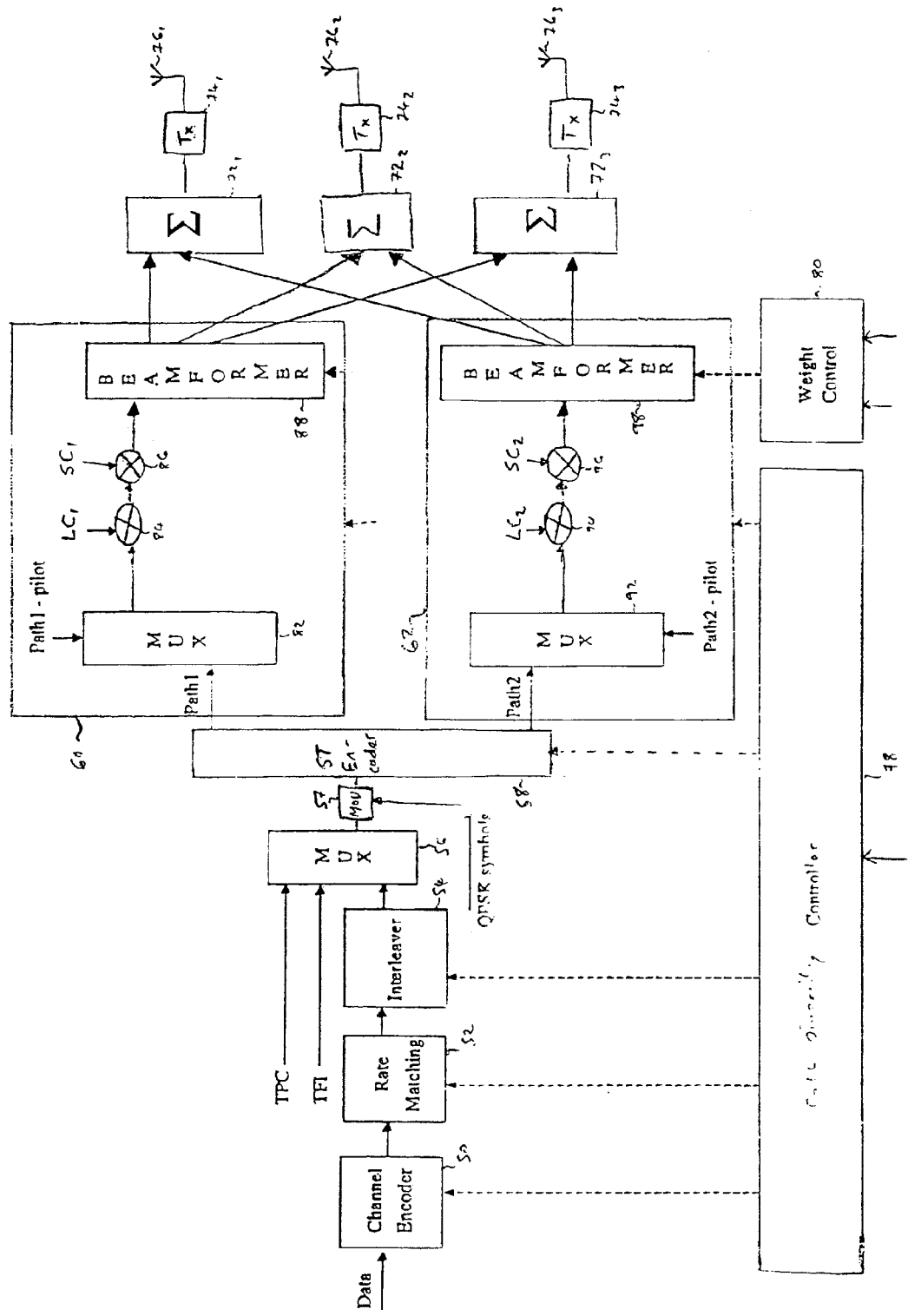
FIG. 4 is a block diagram of parts of a base station in a first embodiment of a communications system.

Parts of a base station for transmitting to a mobile unit in the first embodiment of a communication system are shown in FIG. 4.

Referring to FIG. 4, the base station comprises channel encoder 50, rate matcher 52, interleaver 54, multiplexer 56, modulator 57, space-time encoder 58, path processors 60, 62, adders $72_1$, $72_2$, $72_3$, transmitters $74_1$, $74_2$, $74_3$, antenna elements $76_1$, $76_2$, $76_3$, path diversity controller 78 and weight controller 80. Path processor 60 comprises multiplexer 82, scrambler 84, spreader 86 and beam former 88; path processor 62 comprises multiplexer 92, scrambler 94, spreader 96 and beam former 98. Similar channel encoders, rate matchers, interleavers, multiplexers, modulators, space-time encoders, and path processors are provided for transmission to other mobile units. For simplicity, these are not shown in FIG. 4.

In operation, data for transmission from the base station to the mobile unit is input to channel encoder 50. In this example, channel encoder 50 comprises a convolution coder, which codes incoming bits according to a particular polynomial, so as to introduce redundancy into the data signal. By coding the data signal in this way, forward error correction of bit errors which may occur during transmission is provided. Alternatively channel encoder 50 may comprise a turbo coder. Turbo coding may provide better error protection than convolution coding, but generally causes a longer delay to be introduced to the transmission signal. Thus convolution coding may be preferred where speech is to be transmitted in the transmission signal, whereas turbo coding may be preferred where other, less time-sensitive, forms of data are to be transmitted.

The output of channel encoder 50 is input to rate matcher 52. The rate matcher ensures that the data rate at its output is constant, even if the data rate at its input varies. The output of rate matcher 52 is input to interleaver 54. Interleaver 54 rearranges the order of bits and/or blocks in the signal at its input. In this way, the effect of a short fade in the transmission signal can be spread out over several bits and/or blocks which reduces the impact of the fade. Furthermore, convolution codes are most effective with uncorrelated errors and the interleaver 54 makes correlated errors appear as uncorrelated errors once the signal has been de-interleaved. Thus interleaver 54 increases the effectiveness of the convolution coding carried out by channel encoder 50.

The output of interleaver 54 is multiplexed with transmission power control (TPC) bits and transmission feedback information (TFI) bits in multiplexer 56. The multiplexed signal is then modulated in modulator 57 using Quadrature Phase Shift Keying (QPSK). The modulated signal is fed to space-time (ST) encoder 58.

Figure 5:
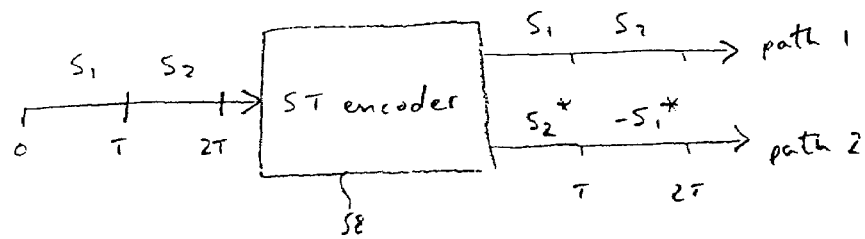
FIG. 5 is a block diagram of a space-time encoder for use in the first embodiment.

Space-time encoder 58 has two functions. Firstly it divides the signal at its input into two separate signals (data paths), and secondly it applies different coding to the two signals. A block diagram of the space-time encoder 58 is shown in FIG. 5.

The space-time encoder 58 operates in cycles of two symbol periods. Within a cycle, a sequence, consisting of a first symbol $S_1$ in a first symbol period and a second symbol $S_2$ in a second symbol period, which is input to the space-time encoder appears at the first output as a simple repetition of this, that is, first $S_1$ and then $S_2$. However, the sequence at the second output (path 2) is first the complex conjugate of the second symbol and then the inverse of the complex conjugate of the first symbol, i.e. $S_2^*$, $-S_1^*$, where * denotes the complex conjugate. This operation is repeated for successive cycles of two symbols. In this way, two signals representing the signal to be transmitted are produced, with each of the signals being differently coded.

In order to implement the above operations, the space-time encoder may introduce a delay between the input and outputs of at least one symbol period so that the second symbol in an input sequence is known at the beginning of an output sequence.

Referring back to FIG. 4, the first output of the space-time encoder 58 is fed to a first data path processor 60, and the second output of the space-time encoder 58 is fed to a second data path processor 62. Data path processors 60, 62 are each allocated to a particular transmission path that exists between the base station and the mobile unit, under control of path diversity controller 78.

In the data path processors 60, 62, the data paths are first multiplexed with respective pilot signals in multiplexers 82, 92. By providing a different pilot signal in each of the data paths, the two data paths can be distinguished from each other at the mobile unit. The outputs of multiplexers 82, 92 are fed to scramblers 84, 94. Scramblers 84, 94 scramble the signals at their inputs according to a scrambling code, also known as a long code (LC). If different scrambling codes are used ($LC_1 \neq LC_2$), this may provide an additional or alternative means of distinguishing between various signals. Other techniques for distinguishing between the various signals could be used instead; for example, the spreading code used for CDMA may be different for each path ($SC_1 \neq SC_2$), or certain data bits of a transmission frame may be reserved for distinguishing between the various paths. However it may be that no specific measures need be taken to enable the various paths to be distinguished from each other, since the despreaders at the mobile unit can separate signals transmitted via different paths provided they have a differential time delay of greater than one chip period.

The outputs of scramblers 84, 94 are fed to spreaders 86, 96 respectively. The spreaders 86, 96 spread the signals at their inputs according to a unique spreading code, also referred to as a short code (SC), so as to enable CDMA transmission. In one example the same spreading code is used for the two paths ($SC_1 = SC_2$) and different spreading codes are used for different mobile units. However, different spreading codes could also be used for different paths, which may improve the quality of the signal obtained by the corresponding mobile unit.

The outputs of spreaders 86, 96 are fed to respective beam formers 88, 98. The beam formers operate under control of weight control unit 80. As will be explained later, weight control unit 80 receives two angle of arrival (AoA) signals which are estimates of the angles of arrival of signals received from the mobile unit.

Each of the beam formers 88, 98 splits the signal at its input into three separate signals, and multiplies each signal by a complex value, known as a beam former weight. Each beam former thus outputs three digital baseband signals, which are added to the corresponding outputs of the other beam former in adders $72_1$, $72_2$, $72_3$. The outputs of the adders are converted to analogue and up-converted to radio frequency by transmitters $74_1$, $74_2$, $74_3$, and then fed to antenna elements $76_1$, $76_2$, $76_3$. By appropriate choice of the beam former weights, the beam formers produce signals which, when transmitted by the antenna elements $76_1$, $76_2$, $76_3$, cause directional transmission beams to be formed. In this way, two separate directional transmission beams are formed, each corresponding to one of the two data paths.

Figure 6:
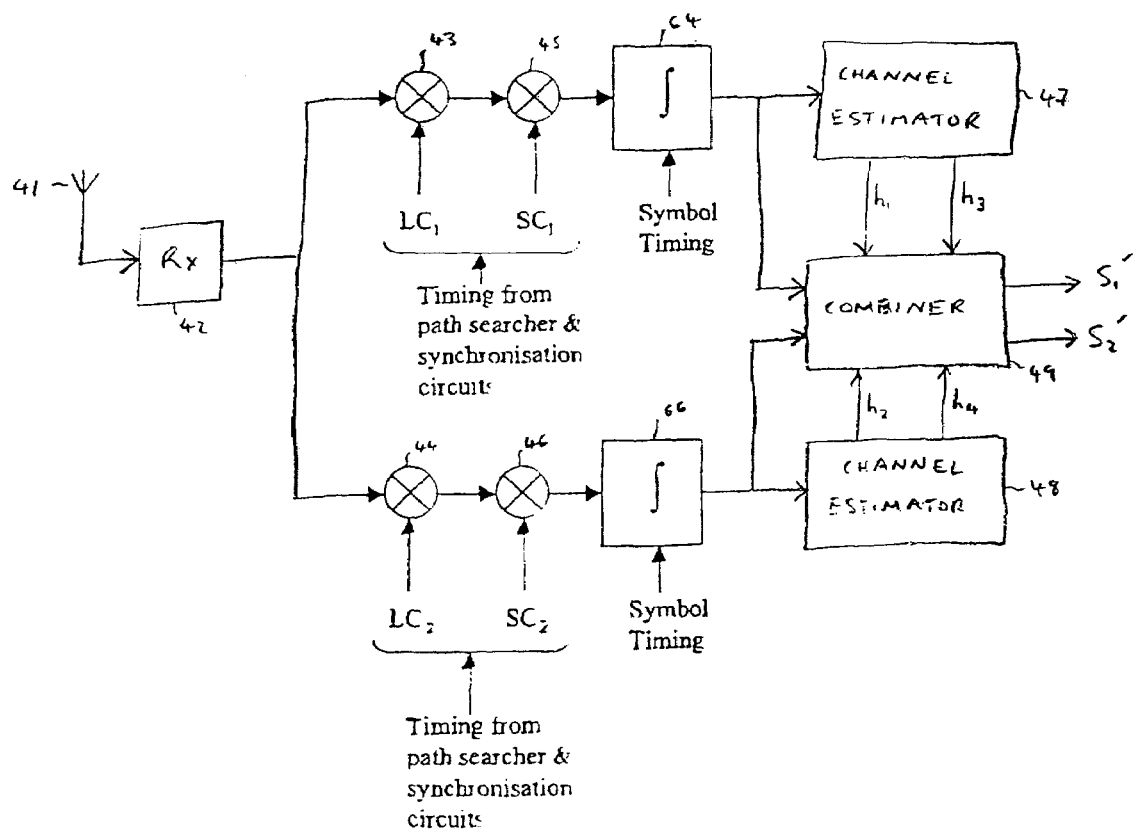
FIG. 6 is a block diagram of parts of a mobile unit in the first embodiment.

Parts of the mobile unit for receiving the signals transmitted by the base station are shown in FIG. 6. The mobile unit comprises antenna 41, receiver 42, descramblers 43, 44, despreaders 45, 46, integrators 64, 66, channel estimators 47, 48 and combiner 49.

In operation, signals received from antenna 41 are fed to receiver 42, which down-converts and digitises the received signals to yield a complex-valued digitised received baseband signal. The output of receiver 42 is separated into two paths. One path is fed to descrambler 43, despreader 45 and integrator 64, while the other path is fed to descrambler 44, despreader 46 and integrator 66. Descrambler 43, despreader 45 and integrator 64 descramble and despread the signal received via the first transmission path using replicas of the spreading and scrambling codes $LC_1$ and $SC_1$ in FIG. 4, while descrambler 44, despreader 46 and integrator 66 descramble and despread the signal received via the second transmission path using replicas of the spreading and scrambling codes $LC_2$ and $SC_2$ in FIG. 4.

The output of integrator 64 is fed to channel estimator 47 and the output of integrator 66 is fed to channel estimator 48. The channel estimators 47, 48 produce estimates of the channel amplitude and phase for the corresponding transmission paths, as well as estimates of the channel amplitude and phase of the interference paths from one transmission path to another. This may be done, for example, by comparing replicas of the pilot signals inserted by multiplexers 82, 92 in FIG. 4 with the received versions of the pilot signals, to obtain estimates of the channel amplitudes and phases.

The outputs of integrators 64, 66 are also fed to combiner 49 together with the channel estimates produced by channel estimators 47, 48. As will now be explained, the combiner 49 combines the received signals with the channel estimates so as to recover the original data symbols $S_1$ and $S_2$ input to space-time encoder 58 in FIG. 4.

Assuming that the various transmission paths remain constant, the channel vectors for the transmission paths can be written as $$h_1 = \alpha_1 e^{j\theta_1} \tag{1}$$

$$h_2 = \alpha_2 e^{j\theta_2} \tag{2}$$

where $h_1$ is the channel vector for the first transmission path (amplitude $\alpha_1$ and phase $\theta_1$) and $h_2$ is the channel vector for the second transmission path (amplitude $\alpha_2$ and phase $\theta_2$). In addition, the first transmission path causes interference to the second transmission path, and the second transmission path causes interference to the first transmission path. Thus there are also two interference paths which may be written as $$h_3 = \alpha_3 e^{j\theta_3} \tag{3}$$

$$h_4 = \alpha_4 e^{j\theta_4} \tag{4}$$

where $h_3$ is the channel vector for the interference path from the second transmission path to the first transmission path, and $h_4$ is the channel vector for the interference path from the first transmission path to the second.

The output of despreader 45 is the signal received via the first transmission path plus the interference from the second transmission path, while the output of despreader 46 is the signal received via the second transmission path plus the interference from the first transmission path. Thus the output of despreader 45 can be written as $$r_{11} = h_1 S_1 + h_3 S_2^* \tag{5}$$

$$r_{12} = h_1 S_2 - h_3 S_1^* \tag{6}$$

where $r_{11}$ is the received signal during a first symbol period and $r_{12}$ is the received signal during a second symbol period, ignoring noise and external interference, and the output of the despreader 46 can be written as $$r_{21} = h_2 S_2^* + h_4 S_1 \tag{7}$$

$$r_{22} = h_4 S_2 - h_2 S_1^* \tag{8}$$

where $r_{21}$ is the received signal during a first symbol period and $r_{22}$ is the received signal during a second symbol period, ignoring noise and external interference.

The combiner 49 combines the received symbols with the channel estimates produced by channel estimator 48 according to the following equations, in order to yield recovered versions of the symbols $S_1$ and $S_2$.

$$S_1' = h_1^* r_{11} - h_3 r_{12}^* + h_4^* r_{21} - h_2 r_{22}^* \tag{9}$$

$$S_2' = h_3 r_{11}^* + h_1^* r_{12} + h_2 r_{21}^* - h_4^* r_{22} \tag{10}$$

where $S_1'$ and $S_2'$ are recovered versions of the symbols $S_1$ and $S_2$.

Substituting equations (1) to (8) into (9) and (10) gives $$S_1' = (\alpha_1^2 + \alpha_2^2 + \alpha_3^2 + \alpha_4^2) S_1 \tag{11}$$

$$S_2' = (\alpha_1^2 + \alpha_2^2 + \alpha_3^2 + \alpha_4^2) S_2 \tag{12}$$

It can be seen that the recovered symbols $S_1'$ and $S_2'$ depend only on the channel amplitudes $\alpha_1$, $\alpha_2$, $\alpha_3$ and $\alpha_4$, and not on the channel phases $\theta_1, \theta_2, \theta_3$ and $\theta_4$. As was discussed above, in a conventional CDMA system the differential phase delays that exist between various transmission paths can lead to interference between the signals. In the system described above the interference is cancelled by appropriate processing of the transmitted and received symbols. This scheme is called space-time diversity because any one symbol is transmitted via two different paths (space diversity) at two different times (time diversity). This technique is therefore effective in reducing the effect of fades, especially those occurring on one transmission path only.

In an alternative scheme to that described above, the space-time encoder 58 is arranged such that the signal at its first output is $S_1, -S_2^*$ and the signal at its second output is $S_2, S_1^*$.

The scheme may be extended to three or more transmission paths if required. An example of a coding scheme that may be used in such a case is given below.

Using a ½ rate coder:

$$G_1 = \begin{vmatrix} S_1 & S_2 & S_3 \\ -S_2 & S_1 & -S_4 \\ -S_3 & S_4 & S_1 \\ -S_4 & -S_3 & S_2 \\ S_1^* & S_2^* & S_3^* \\ -S_2^* & S_1^* & -S_4^* \\ -S_3^* & S_4^* & S_1^* \\ -S_4^* & -S_3^* & S_2^* \end{vmatrix}$$

$$G_2 = \begin{vmatrix} S_1 & S_2 & S_3 & S_4 \\ -S_2 & S_1 & -S_4 & S_3 \\ -S_3 & S_4 & S_1 & -S_2 \\ -S_4 & -S_3 & S_2 & S_1 \\ S_1^* & S_2^* & S_3^* & S_4^* \\ -S_2^* & S_1^* & -S_4^* & S_3^* \\ -S_3^* & S_4^* & S_1^* & S_2^* \\ -S_4^* & -S_3^* & S_2^* & S_1^* \end{vmatrix}$$

Other appropriate arrangements will be apparent to the skilled person.

Second Embodiment

In a second embodiment of a communications system, path diversity is used in the downlink between the base station and a mobile unit, with different channel coding applied to each transmission signal. The channel coding for each transmission signal is chosen so as to reduce the cross-correlation between the transmission signals. In this way, the interference between the various signals can be reduced.

Figure 7:
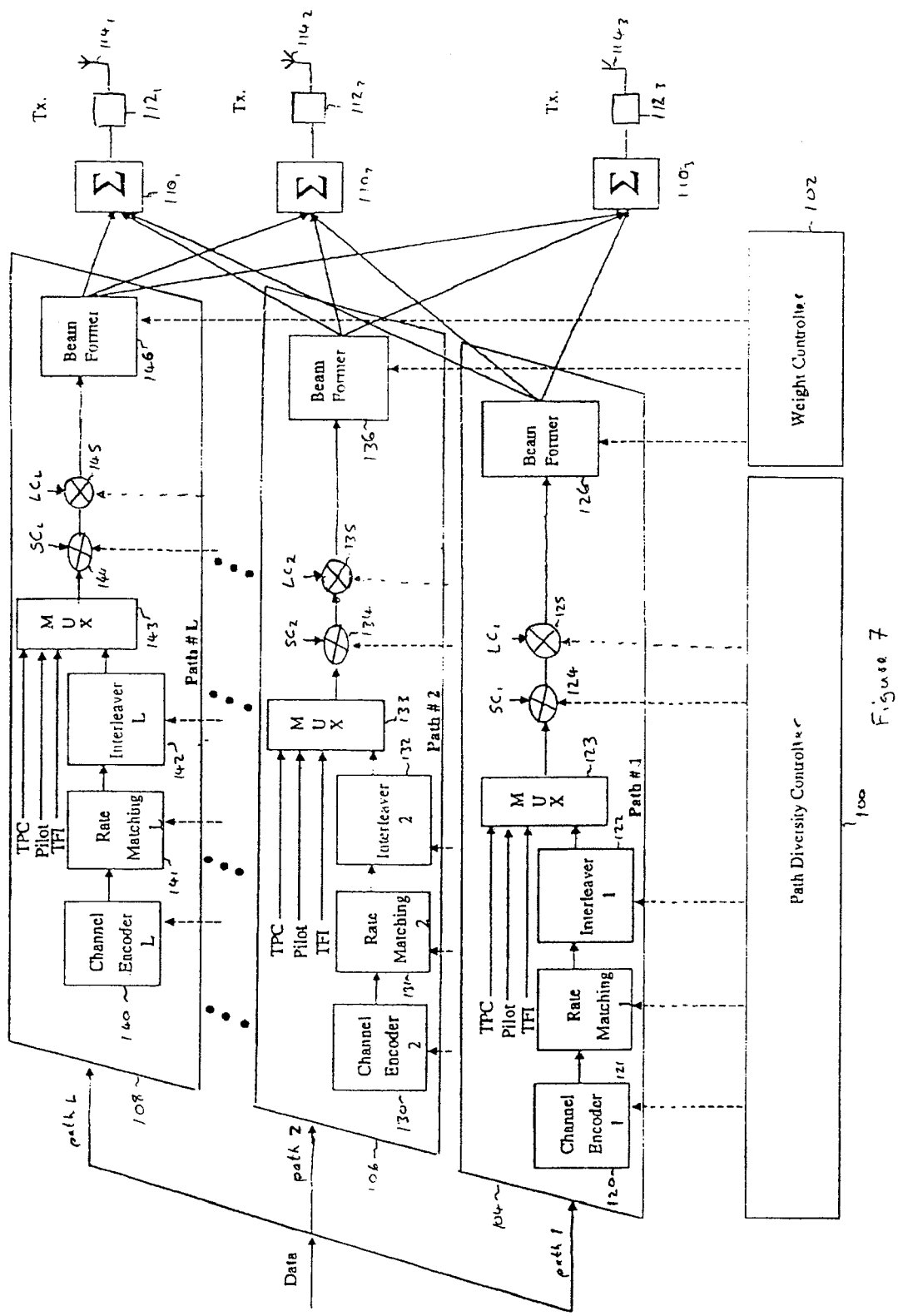
FIG. 7 is a block diagram of parts of a base station in a second embodiment of a communications system.

Parts of a base station for transmitting to a mobile unit in the second embodiment are shown in FIG. 7. Referring to FIG. 7, the base station comprises path diversity controller 100, weight controller 102, transmission path processors 104, 106, 108, adders 110$_1$, 110$_2$, 110$_3$, transmitters 112$_1$, 112$_2$, 112$_3$ and antenna elements 114$_1$, 114$_2$, 114$_3$. Path processor 104 comprises channel encoder 120, rate matcher 121, interleaver 122, multiplexer 123, spreader 124, scrambler 125 and beam former 126; path processor 106 comprises channel encoder 130, rate matcher 131, interleaver 132, multiplexer 133, spreader 134, scrambler 135 and beam former 136; path processor 108 comprises channel encoder 140, rate matcher 141, interleaver 142, multiplexer 143, spreader 144, scrambler 145 and beam former 146.

In operation, data for transmission from the base station to the mobile unit is separated into a number of data paths (paths 1, 2, . . . L) corresponding to a number of transmission paths which exist between the base station and the mobile unit, under control of path diversity controller 100. The data paths are dynamically allocated under control of path diversity controller 100 as new transmission paths appear and old paths disappear. Each of the data paths is processed by the corresponding data path processor 104, 106, 108.

Within each data path processor 104, 106, 108, the corresponding data path is first encoded by channel encoder 120, 130, 140. In this embodiment, channel encoders 120, 130, 140 are convolution coders, and each of the encoders 120, 130, 140 applies a different convolution code.

Figure 8:
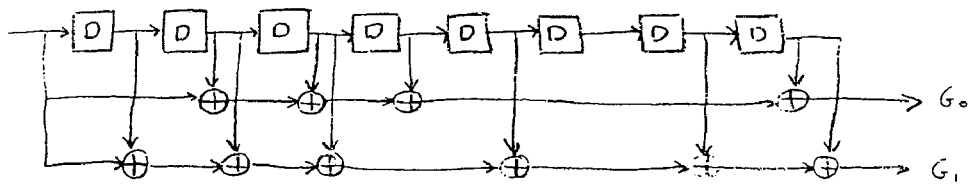
FIG. 8 shows an example of a convolution coder for use in the second embodiment.

An example of a convolution coder is shown in FIG. 8. In FIG. 8, the coder has eight shift registers (D), and is said to have a constraint (or influence) length of nine. The input signal and the outputs of the various shift registers are combined according to a particular polynomial to yield the coded signal. In this example the encoding polynomials can be written as $G_0=1+D^2+D^3+D^4+D^8$ $G_1=1+D+D^2+D^3+D^5+D^7+D^8$ The output from the convolution coder is taken in the order $G_0, G_1, G_0, G_1, G_0, \ldots, G_1$ to give an output signal with twice the length of the original signal (rate ½ convolution coder). The initial values of the shift registers are all binary 0. Eight tail bits with binary value 0 are added to the end of a code block before encoding, to ensure the return to the initial state at the end of a block.

In the present embodiment, each of the channel encoders 120, 130, 140 uses a different polynomial to code the signal at its input. For example, the channel encoder 120 may apply the convolution code described above, while channel encoders 130 and 140 each apply convolution codes with different polynomials. Channel encoders 120, 130, 140 may use any form of convolution coding with any appropriate set of polynomials. Any appropriate constraint length and code rate may be used. If required, punctured convolution codes may be used. Examples of suitable polynomials are as follows.

⅙ Rate; Constraint 5

$G_1=1+D+D^3+D^4$ $G_2=1+D^2+D^4$ $G_3=1+D+D^3+D^4$ $G_2=1+D^2+D^4$ $G_3=1+D+D^2+D^3+D^4$

¼ Rate; Constraint 5

$G_1/G_3=(1+D+D^3+D^4)/(1+D+D^3+D^4)$ $G_2/G_3=(1+D^2+D^3)/(1+D+D^3+D^4)$ $G_3/G_3=1$ $G_3/G_3=1$

⅓ Rate; Constraint 7

$G_4=1+D^2+D^3+D^5+D^6$ $G_7=1+D+D^4+D^6$ $G_5=1+D+D^4+D^6$

The outputs of the channel encoders 120, 130, 140 are rate matched in respective rate matchers 121, 131, 141 and interleaved in respective interleavers 122, 132, 142. Pilot bits, transmission power control (TPC) bits and transmission feedback information (TFI) bits are added in respective multiplexers 123, 133, 143. Spreading codes are applied in spreaders 124, 134, 144 and scrambling codes are applied in scramblers 125, 135, 145. The spreading code for each path may be the same ($SC_1=SC_2=SC_3$), or two or more of the spreading codes may be different. Similarly, the scrambling codes for each path may be the same or different. The various data paths are then fed to respective beam formers 126, 136, 146. The outputs of the beam formers 126, 136, 146 are fed to adders $110_1$, $110_2$, $110_3$. The outputs of adders $110_1$, $110_2$, $110_3$ are fed to transmitters $112_1$, $112_2$, $112_3$ and thence to antenna elements $114_1$, $114_2$, $114_3$. The beam formers 126, 136, 146 process the signals at their inputs such that, when the signals are transmitted by antenna elements $114_1$, $114_2$, $114_3$, a directional transmission beam is formed for each of the data paths.

Rate matchers 121, 131, 141 and interleavers 122, 132, 142 may also be adjusted in accordance with the various channel coding schemes that are applied by channel encoders 120, 130, 140 to ensure that the correct data rates are used and that the interleaving is effective.

Figure 9:
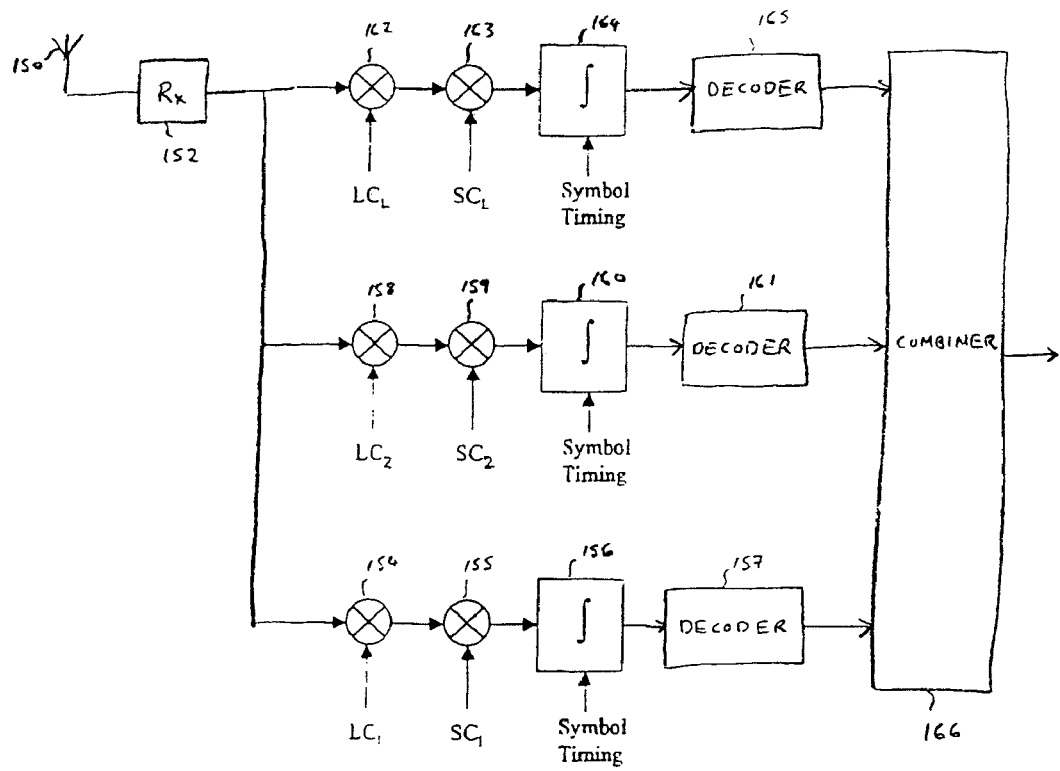
FIG. 9 is a block diagram of parts of a mobile unit in the second embodiment.

Parts of the mobile unit for use with the base station of the second embodiment are shown in FIG. 9. The mobile unit comprises antenna 150, receiver 152, descramblers 154, 158, 162, despreaders 155, 159, 163, integrators 156, 160, 164, decoders 157, 161, 165 and combiner 166.

In operation, signals received from antenna 150 are fed to receiver 152, which down-converts and digitises the received signals. The output of receiver 152 is split and fed to descramblers 154, 158, 162. The descramblers descramble the signals using replicas of the scrambling code or codes used by scramblers 125, 135, 145 in FIG. 7. The outputs of scramblers 154, 158, 162 are fed to despreaders 155, 159, 163.

Each of the despreaders 155, 159, 163 despreads a signal received via a different transmission path using a despreading code, which is a replica of the spreading code used by spreaders 124, 134, 144 in FIG. 7. The despreading codes obtain their timing from path searcher and synchronisation circuits (not shown) so that they are synchronised with the received signals. In this way, the despreaders 155, 159, 163 can resolve the signals transmitted via the various transmission paths, as long as the differential delay between the transmission paths is greater than the chip rate of the spreading code. Alternatively, if different spreading codes are used for the various transmission paths, then this provides a means of distinguishing between the signals transmitted via the various transmission paths.

The outputs of the despreaders 155, 159, 163 are fed to integrators 156, 160, 164, which integrate the signals to yield signals comprising the despread received symbols. The outputs of the integrators 156, 160, 164 are then fed to decoders 157, 161, 165 respectively. Each of the decoders 157, 161, 165 decodes the signal encoded by one of the channel encoders 120, 130, 140 in FIG. 7. In this example, decoders 157, 161, 165 are convolution decoders which employ Viterbi algorithms and Maximum Likelihood Decision algorithms to decode the signals at their inputs. Such decoders are well known and thus are not described here in detail. Further information may be found in "Principles of Digital Communication and Coding" by A. Viterbi and J. K. Omura, McGraw-Hill, New York, 1979, the subject matter of which is incorporated herein by reference. The outputs of decoders 157, 161, 165 are fed to combiner 166 which combines the various signals, taking into account any phase difference between the signals, to yield the output signal.

By providing different coding for each of the transmission paths in the way described above, the effect of interference between the transmission paths can be reduced.

As an alternative to the convolution coders described above, channel encoders 120, 130, 140 in FIG. 7 may be turbo coders. In this case, a different turbo code is applied by each of the channel encoders. The decoders 157, 161, 165 in FIG. 9 are then arranged to decode the corresponding turbo codes. Details of suitable turbo encoders and decoders may be found, for example, in the 3GPP Technical Specifications.

Alternatively or in addition different block codes or different interleaving may be used for each transmission signal.

Third Embodiment

In operation, fading of a transmission signal may occur due to a variety of causes. Long term fading may be caused by obstructions, such as buildings, appearing between the transmitting apparatus and the receiving apparatus. Short term fading may be caused, for example, by scattered radio waves interfering destructively at the receiver.

In a third embodiment of a communications system, the transmission signals from a base station to a mobile unit are monitored, and if a transmission signal has faded then transmission of that transmission signal is suspended so as to reduce interference to other transmission signals. The decision whether to suspend transmission of a transmission signal is based on a feedback signal which is sent from the mobile unit to the base station. The third embodiment may be used independently or in combination with the first or second embodiment.

Figure 10:
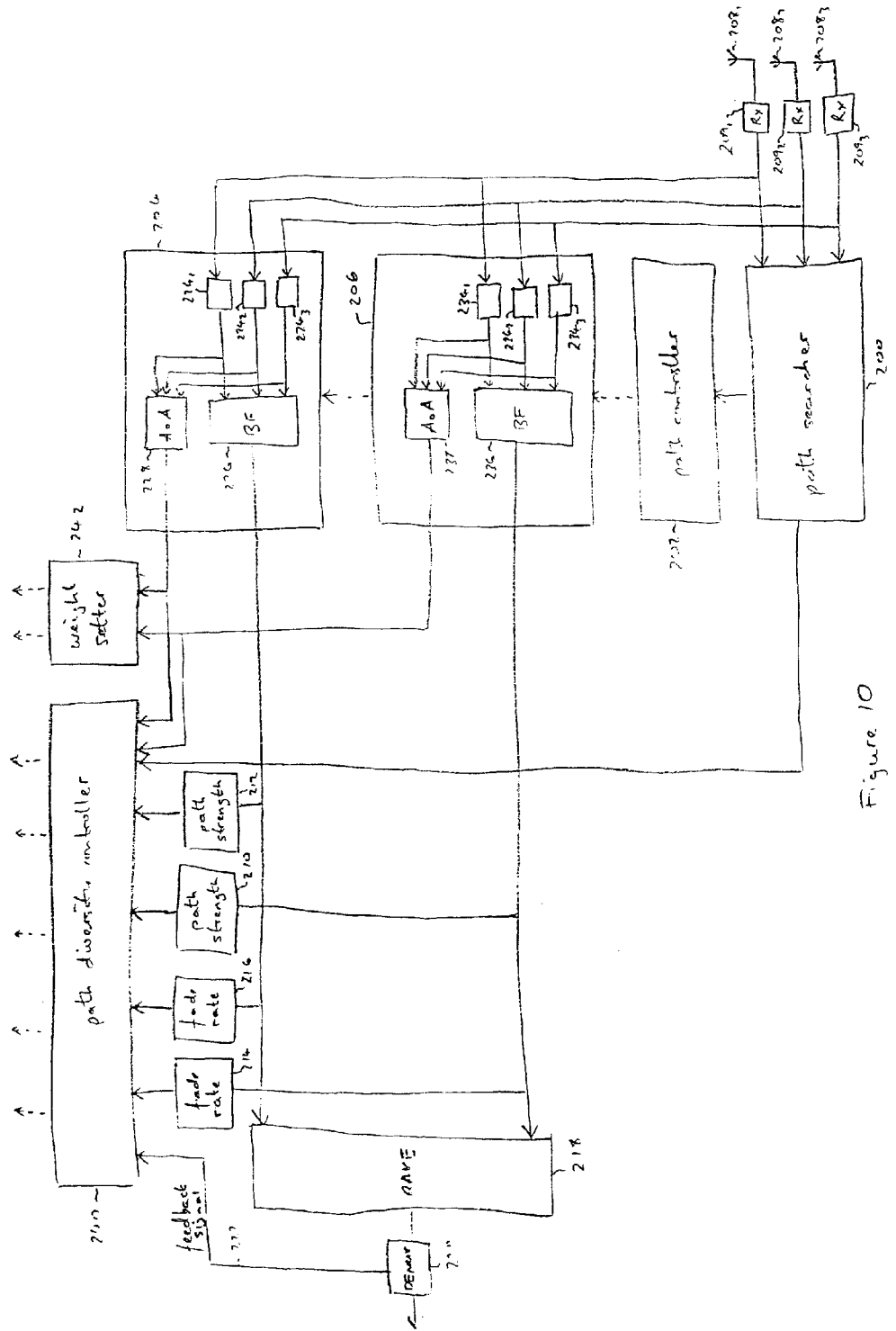
FIG. 10 is a block diagram of parts of a base station in a third embodiment of a communications system.

Parts of a base station for receiving signals from a mobile unit and processing the received signals in the third embodiment are shown in FIG. 10. Referring to FIG. 10, the base station comprises path searcher 200, path controller 202, path processors 204, 206, antenna elements $208_1$, $208_2$, $208_3$, receivers $209_1$, $209_2$, $209_3$, path strength estimators 210, 212, fade rate estimators 214, 216, combiner 218 and demultiplexer 220. Path processor 204 includes despreaders $224_1$, $224_2$, $224_3$, beamformer 226 and angle of arrival (AoA) estimator 228; path processor 206 includes despreaders $234_1$, $234_2$, $234_3$, beamformer 236 and angle of arrival estimator 238.

In operation, path searcher 200 receives signals from antenna elements $208_1$, $208_2$, $208_3$ (which may be the same as antenna elements $76_1$, $76_2$, $76_3$ in FIG. 4 or antenna elements $112_1$, $112_2$, $112_3$ in FIG. 7) via receivers $209_1$, $209_2$, $209_3$. Based on the received signals, the path searcher 200 determines the reception paths (uplink paths) that exist between the mobile unit and the base station. This information is fed to path controller 202, which allocates path processors 204, 206 accordingly. The path processors 204, 206 are allocated dynamically as new paths appear and old paths disappear, and thus at any one time there may be one, two or more path processors 204, 206, depending on the number of reception paths that exist.

Path processors 204, 206 include despreaders $224_1$, $224_2$, $224_3$ and $234_1$, $234_2$, $234_3$ which despread the signals received from the mobile unit so as to obtain baseband versions of the signals transmitted by the mobile unit. Path processors 204, 206 also include beam formers 226, 236 which spatially filter the received signals, such that signals received in the direction of the corresponding reception paths are enhanced while those received from other directions are suppressed. Angle of arrival (AoA) estimators 228, 238, estimate the angles of arrival of the reception paths to which the path processors are allocated, and supply the estimates to the corresponding beam formers 226, 236 to enable the beam formers to converge on to and to track the reception paths. Although a separate beam former is shown in each path processor 204, 206, a common beam former may also be used for two or more reception paths, for example where two paths have a similar direction.

The outputs of the path processors 204, 206 are fed to combiner 218. Combiner 218 is typically a RAKE combiner which combines the various outputs of the path processors 204, 206 with a weighting which depends on the quality of the signals. The output of combiner 218 is fed to demultiplexer 220, which extracts a feedback signal 222.

The outputs of the path processors 204, 206 are also fed to respective path strength estimators 210, 212 and fade rate estimators 214, 216. The path strength estimators 210, 212 estimate the mean path strength of the corresponding reception signals, for example by estimating the power or the amplitude of the reception signals. The averaging period may be, for example, one time slot, or one radio frame, or longer. The fade rate estimators 214, 216 measure the time average of the corresponding reception signals over a short time period (of the order of a few time slots) to obtain estimates of the fade rates. For example, the fade rate may be estimated by determining the rate at which a received despread signal crosses a threshold level. The measuring period may be linked to the averaging period, or may be longer. The threshold level may be set, for example, to the mean path strength as determined by the mean path estimators 210, 212.

The outputs of the path strength estimators 210, 212, the fade rate estimators 214, 216 and the angle of arrival estimators 228, 238, as well as an output from the path searcher 200, and the feedback signal 222, are input to a path diversity controller 240. Path diversity controller 240 may be the same as path diversity controller 78 in FIG. 4 or path diversity controller 100 in FIG. 7. Based on these inputs, the path diversity controller 240 selects which paths to use for path diversity transmission, and allocates data path processors accordingly. The path diversity controller also controls the channel coding, multiplexing of data and control signals, rate matching, interleaving, spreading and scrambling of the various transmission signals.

The path searcher 200 also informs the path diversity controller 240 of the reception (uplink) paths that exist between the mobile unit and the base station. The path diversity controller 240 initially assumes that the physical paths traversed are essentially the same on the downlink as on the uplink. Thus, the path diversity controller initially allocates transmission paths according to the reception paths that are detected by path searcher 200. However, because the transmission conditions are not necessarily the same, for example because a reception path may have faded while a transmission path has not, or vice versa, the path diversity controller then selects the best paths for path diversity transmission. Path selection is based on estimates of the quality of the various transmission paths derived from the feedback signal 222, as well as interference conditions in the cell.

The outputs of the angle of arrival estimators 228, 238 are fed to weight controller 242, which may be the same as weight controller 80 in FIG. 4 or weight controller 102 in FIG. 7. The weight controller 242 uses these inputs to control the weights of the beam formers in the data paths (not shown in FIG. 10). In this example, it is assumed that the directions of the downlink transmission paths are essentially the same as the directions of the reception paths, and thus the angles of arrival of the uplink signals are used to control the angular directions of the transmission beams. In an alternative implementation, two or more trial transmission beams are transmitted, and the mobile unit feeds back a signal indicating which of those beams has the best quality. Based on this feedback signal the directions of the trial beams are adjusted where necessary. Such a technique is described in more detail in co-pending United Kingdom patent application number 0020088.1 in the name of Fujitsu Limited, the entire contents of which are incorporated herein by reference.

Figure 11:
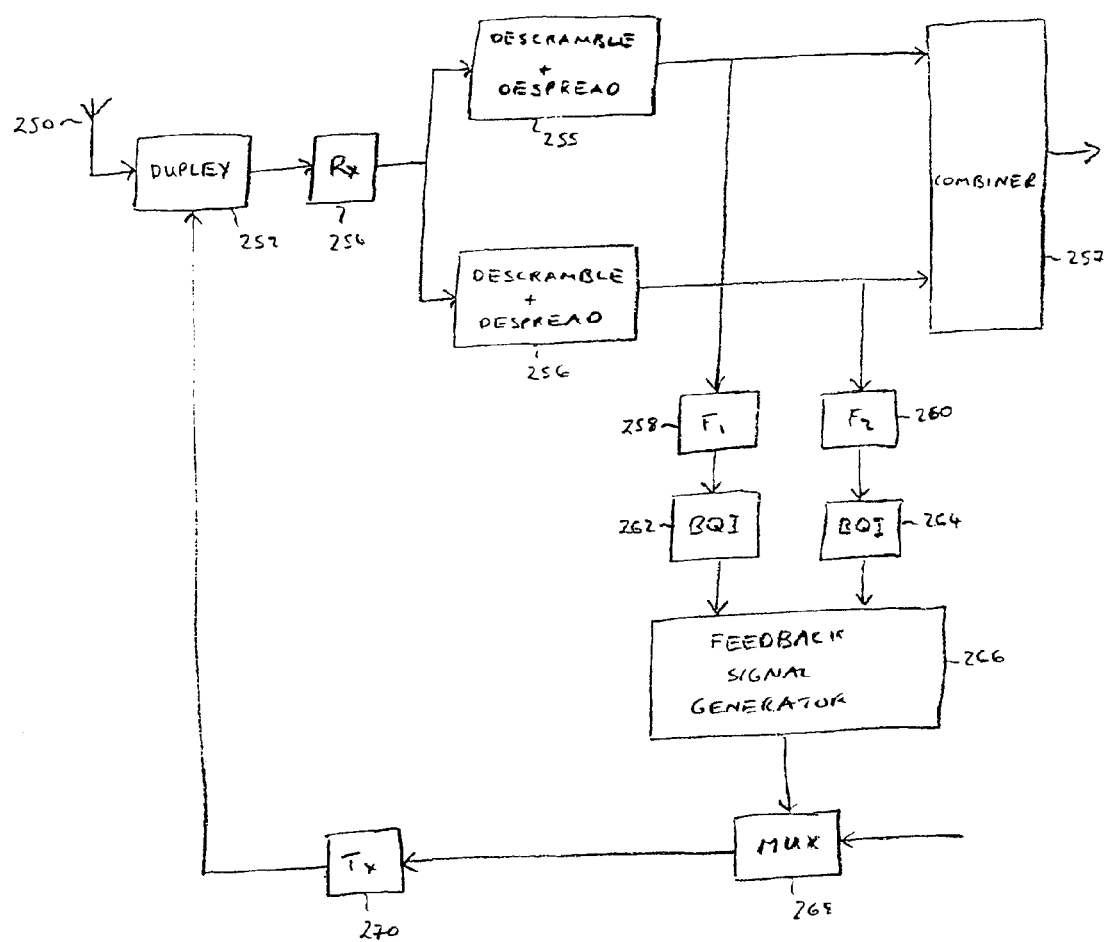
FIG. 11 is a block diagram of parts of a mobile unit in the third embodiment.

Parts of a mobile unit according to the third embodiment will now be described with reference to FIG. 11. The mobile unit comprises antenna 250, duplexer 252, receiver 254, descramblers/despreaders 255, 256, combiner 257, matched filters 258, 260, beam quality indicators 262, 264, feedback signal generator 266, multiplexer 268 and transmitter 270. In operation, transmission beams from the base station are received by antenna 250 and passed to duplexer 252, which separates received and transmitted signals. The radio frequency signals received by antenna 250 are passed to receiver 254, which down-converts the signals and digitizes the down-converted signals. Each of the descramblers/despreaders 255, 256 then descrambles and/or despreads a signal which has been scrambled or spread with a particular spreading or scrambling code and which has been received via a particular transmission path. The descramblers/despreaders 255, 256 may, for example, comprise descramblers, despreaders and integrators similar to those shown in FIGS. 6 and 9. The despread and descrambled signals are then combined in combiner 257.

Each despread signal is also passed to a respective matched filter 258, 260. The matched filters 258, 260 are matched to the distinguishing characteristics which were inserted into the transmission signals by the base station. For example, if different pilot signals were added to the two transmission paths by multiplexers 82, 92 in FIG. 4, then filters 258, 260 are each matched to one of those pilot signals. In certain circumstances, for example if different spreading or scrambling codes were used by spreaders 86, 96 or scramblers 84, 94 in FIG. 4, then filters 258, 260 may be omitted, since the various signals are distinguished by descramblers/despreaders 255, 256.

The outputs of filters 258, 260 are fed to respective beam quality indicators 262, 264. Each beam quality indicator produces a measure of the quality of the signals transmitted via the corresponding transmission path. Any suitable measure of quality can be produced. For example, a received signal strength (RSS) or power measure, a bit error rate (BER) or a frame error rate (FER) measure, or a signal-to-interference ratio (SIR) or a signal-to-interference-and-noise ratio (SINR) measure could be produced. The measure could be based on a pilot signal inserted by the base station, for example by multiplexer 82 or 92 in FIG. 4 or multiplexer 123, 133 or 143 in FIG. 7. Alternatively, the measure could be a transmission power control (TCP) bit generated in the mobile unit for downlink power control purposes. Any of the measures could be based on a history or average of measurements taken over several measurement periods (e.g. time slots) to avoid possible instability when two or more of the transmission paths have approximately the same instantaneous quality.

The measures produced by the beam quality indicators 262, 264 are fed to feedback signal generator 266. Feedback signal generator 266 produces a feedback signal for transmission from the mobile unit to the base station, which feedback signal contains information regarding the various beam qualities as measured by the beam quality indicators 262, 264. The feedback signal is fed to multiplexer 268 to be inserted into a signal for transmission from the mobile unit to the base station. At the base station the feedback signal is extracted as feedback signal 222, as explained above with reference to FIG. 10.

When implementing the present embodiment, the frame format shown in FIG. 2 may be used for downlink transmission. The pilot bits contained in the control channel may be used for measuring the quality of the received signals in the beam quality indicators 262, 264.

In the uplink, the frame format shown in FIG. 3 may be used, and the feedback signal may be sent using the feedback information bits FBI. In one example, a single FBI bit is used for each transmission beam, the bit indicating whether or not the beam has faded.

Thus, if two transmission beams were sent, then two feedback symbols would be needed on which to base path selection. Alternatively, a number of FBI bits may be used to indicate the quality of each transmission beam. For example, an output of beam quality estimator 262 may be sent using the FBI bits of one time slot and an output of beam quality estimator 264 sent using the FBI bits of another time slot. Alternatively, the outputs of the beam quality estimators 262, 264 may be sent using the FBI bits of several time slots each. The outputs of the beam quality estimators may be multiplexed with other feedback information which is sent using the FBI bits.

Figure 12:
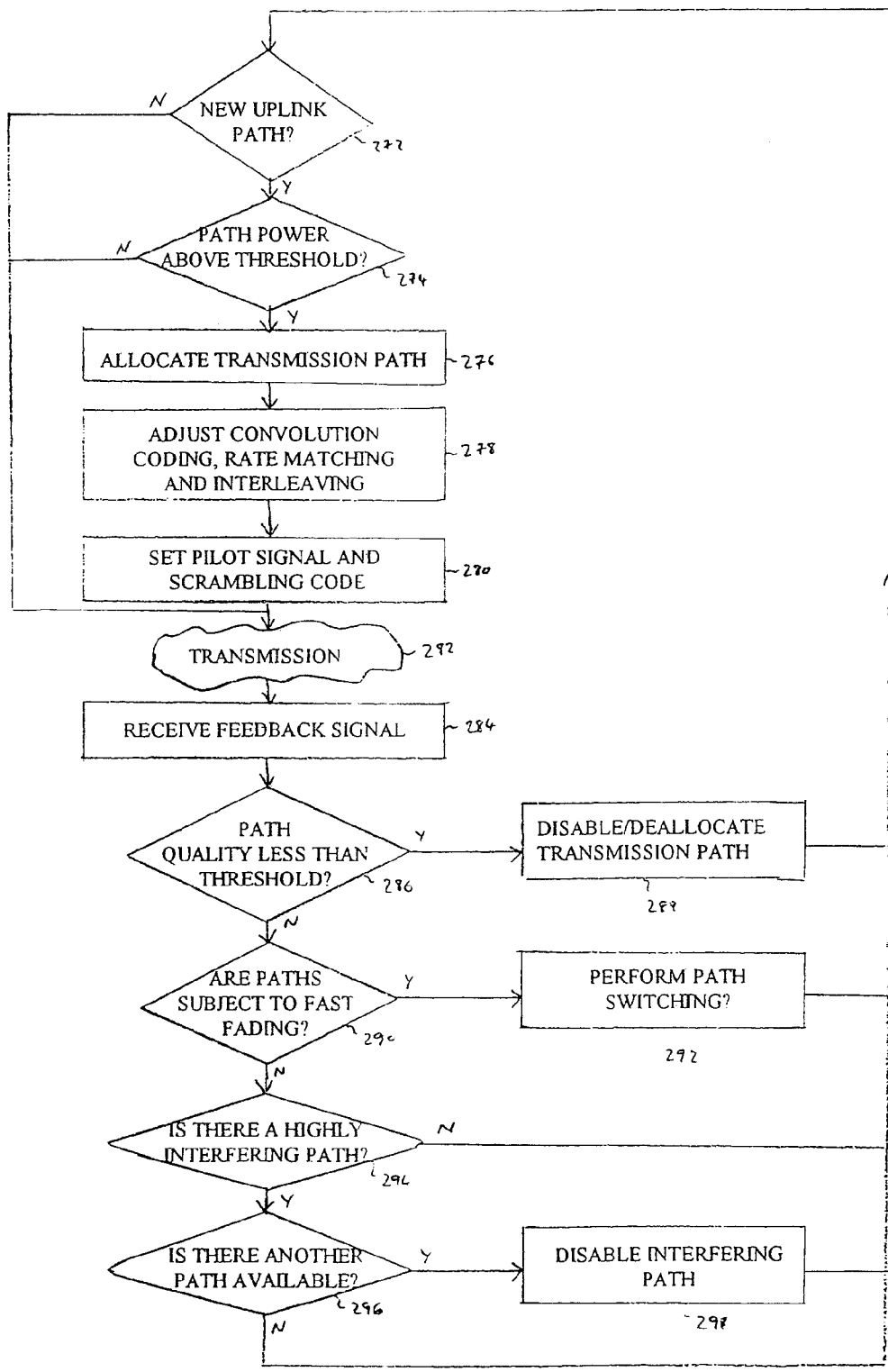
FIG. 12 is a flow diagram illustrating operation of a path diversity controller in the third embodiment.

Operation of the path diversity controller 240 will now be explained with reference to FIG. 12. Referring to FIG. 12, in step 272 the path diversity controller 240 receives an input from path searcher 200 indicating whether a new uplink (reception) path has appeared between the mobile unit and the base station. If a new reception path has appeared, then in step 274 it is determined whether the power of that path is above a certain threshold. This is done by comparing the output of the appropriate power strength estimator 210, 212 in FIG. 10 with a threshold value. If the strength of the reception path is above the threshold, then in step 276 a downlink transmission path is allocated to that reception path. This is done by allocating a path processor (such as path processor 60 in FIG. 4 or path processor 104 in FIG. 7) to that transmission path.

The path processor may have its own beam former, or it may share a beam former with one or more other path processors. For example, if the differential angle of arrival between two or more paths is greater than a predetermined threshold (for example, the 3 dB beamwidth of a transmission beam) then an individual beam former may be allocated to each transmission path, so that separate transmission beams are formed for each of the paths. For those paths where the differential angle of arrival is less than the predetermined threshold a common beam former may be allocated.

In step 278 the convolution coding, rate coding and interleaving of the transmission path are adjusted to be appropriate for the transmission conditions. For example, adjustments may be made to take into account the quality of the transmission channel, so that if the channel quality is poor a greater level of redundancy may be added by the convolution coder and a greater depth of interleaving used.

In step 280 the pilot signal and/or the scrambling code of the transmission path is set. Different pilot symbols and/or different scrambling codes are set for each of the transmission paths, so that the signals transmitted via the various transmission paths may be distinguished from each other. For example, the multiplexers 82, 92 in FIG. 4 may insert different pilot symbols into each of the paths, or the scramblers 86, 96 in FIG. 4 may use different scrambling codes for each of the paths. By this means the mobile unit can distinguish between signals transmitted via different transmission paths, and thus assess the quality of each of the transmission paths. This quality information is inserted into the uplink signal as a feedback signal. In addition, the use of different scrambling codes for the various transmission paths may reduce the fading due to destructive interference between phase offset paths.

In step 282 transmission takes place between the base station and the mobile unit using the various transmission paths that have been allocated.

In step 284 the path diversity controller 240 receives the feedback signal 222 from the mobile unit indicating the quality of the various transmission paths. In step 286 the path diversity controller compares the quality of each of the transmission paths to a predetermined threshold to determine whether that path is suitable for downlink transmission. If the quality of a path is above the threshold then that path is considered suitable for downlink transmission; if the quality of the path is below the threshold then in step 288 that path is disabled or deallocated.

If a transmission path is disabled in step 288, then transmission of a control signal still takes place via that transmission path, but transmission of data is disabled. In this way the mobile unit can continue to monitor the quality of the transmission path, but since no data is transmitted the signal will cause little interference to other signals. If the quality of the transmission path subsequently improves, the transmission path is re-enabled.

If a transmission path is de-allocated in step 288, all transmission on that path is halted and the data path processor is made available for allocation to another transmission path. A transmission path may be de-allocated if the quality of that path has been poor for a certain amount of time, or if a new reception path appears which has a good quality.

It will be seen that, by providing a feedback signal from the mobile unit to the base station, the base station can assess whether or not a particular path is suitable for downlink transmission, regardless of the transmission conditions for the corresponding uplink path. Thus, if the uplink transmission path has faded but the corresponding downlink transmission path has not faded, the downlink transmission path may still be used. Conversely, if the downlink transmission path has faded, then that path is disabled or deallocated regardless of whether the corresponding uplink transmission path has faded. This technique is referred to herein as path selection.

In the path selection technique described above, the need for the feedback signal to be transmitted from the mobile unit to the base station leads to a delay between the fading of a transmission path and the transmission path being disabled in response to the fading. If the fade rate is greater than the path selection rate then the path selection technique will not function correctly for that transmission path. In this case, path selection for that transmission path is disabled. Thus, in step 290 it is assessed whether each of the various transmission paths are subject to fast fading (for example, greater than the path selection rate). If a path is not subject to fast fading, then it is considered suitable for path selection. If the path is subject to fast fading, then, in step 292, it is considered for open loop path switching, as will be explained later.

The assessment of whether the path is subject to fast fading in step 290 may be done either based on the uplink fade rate, or on the feedback signal 222, or both. If the assessment is based on the uplink fade rate, then the short time averages of the uplink signals are measured by fade rate estimators 214, 216 in FIG. 10 for the respective uplink paths. If the average amplitude for a path is above a specified threshold, indicating that the fade rate is acceptable, the path is considered viable for path selection. If the amplitude is below the threshold, indicating that the fade rate is too high, then in step 292 the path is considered for path switching.

If the assessment is based on the feedback signal, then the feedback signal is monitored continually, and the history of the respective beam qualities used to assess whether the paths are stable or not. If a path history shows that a path is appearing and disappearing frequently, the path is considered to be unsuitable for path selection, and in step 292 the path is considered for path switching. Paths that appear for a specified period of time are considered suitable for path diversity mode.

If a hybrid decision process is used, both the fade rate and the feedback information are assessed when making the decision whether to use path selection. For example, when both the uplink fade rate and the path history indicate that path selection is suitable, then the path may be assigned for path selection; in all other cases path selection is not used and path switching is considered instead.

As mentioned above, if a path is not considered suitable for path selection due to a high fading rate, it may nonetheless be considered for open loop path switching. In open loop path switching, a transmission signal is transmitted alternatively via two or more transmission paths without considering the feedback signal. The aim of the path switching is to switch between paths fast enough to reduce the effect of fading by switching faster than the fade rate, while keeping interference to other users to a minimum by not transmitting on the two paths simultaneously.

In some circumstances a transmission signal transmitted via a particular transmission path may cause a significant amount of interference to other users. This is particularly the case for high data rate transmission signals. Thus in step 294 it is optionally considered whether any of the various transmission paths are likely to cause significant interference to other users. This can be done by considering the directions and relative powers of the transmission paths. If it is decided that a particular transmission path is likely to cause significant interference to other users, then in step 296 it is considered whether another, less interfering, transmission path exists between the base station and the mobile unit. If such a path exists then in step 298 the interfering path is disabled, even if that path would otherwise be satisfactory.

For example, if a number of users are all physically located close to each other, then a so-called traffic hot spot may arise. The presence of a large number of users in a traffic hot spot may lead to high levels of interference between the transmission signals of the various users. This situation may be compounded by the presence of a high data rate user in the traffic hot spot. Thus, in step 294 it may be considered whether a transmission path of a high data rate user is in the same direction as a traffic hot spot. A traffic hot spot may be identified by considering the transmitter power density profile, which is the transmitter power density as a function of angular direction.

Figure 13:
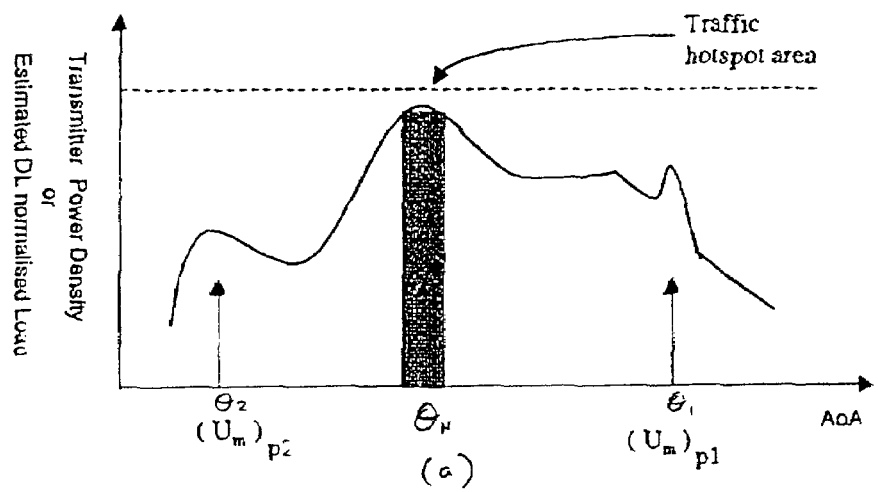
FIG. 13 show examples of transmitter power density profiles.
Figure 13:
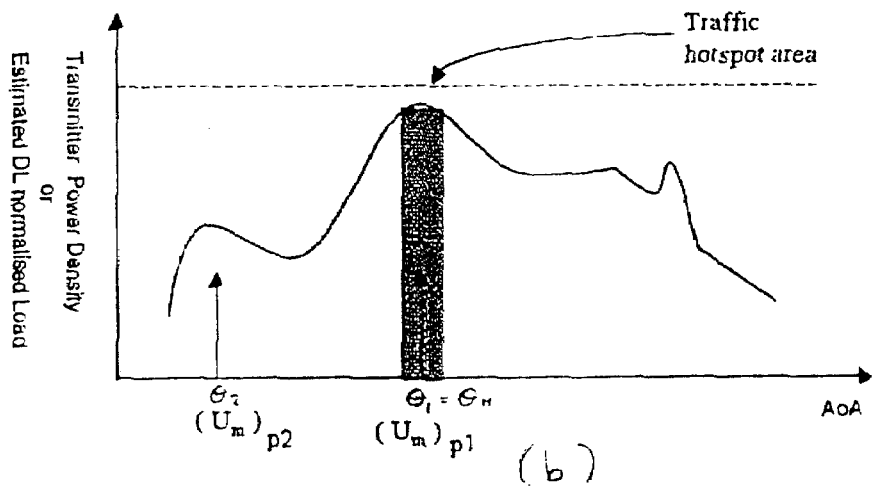

FIG. 13 show examples of transmitter power density profiles. In FIG. 13(*a*) a traffic hot spot occurs in direction $\theta_H$, and a high data rate user has two transmission paths $P_1$ and $P_2$ in directions $\theta_1$ and $\theta_2$ respectively. In this case, neither of $P_1$ or $P_2$ are in the direction of the traffic hot spot, and so both $P_1$ and $P_2$ are used for path diversity transmission. In FIG. 13(*b*) the transmission path $P_1$ is in the same direction as the traffic hot spot ($\theta_1 = \theta_H$). Transmission path $P_1$ is therefore disabled to prevent this path interfering with the other users in the traffic hot spot, since an alternative path ($P_2$) exists.

Figure 14:
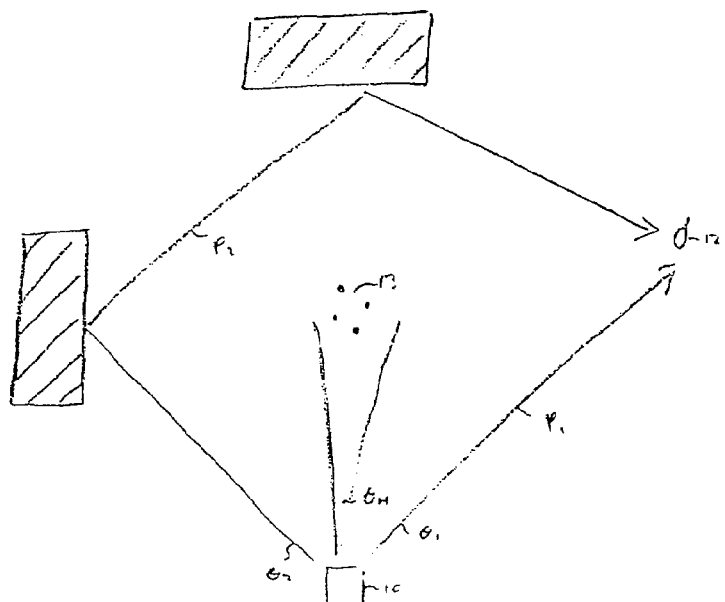
FIG. 14 show examples of transmission paths from a base station to a mobile unit.
Figure 14:
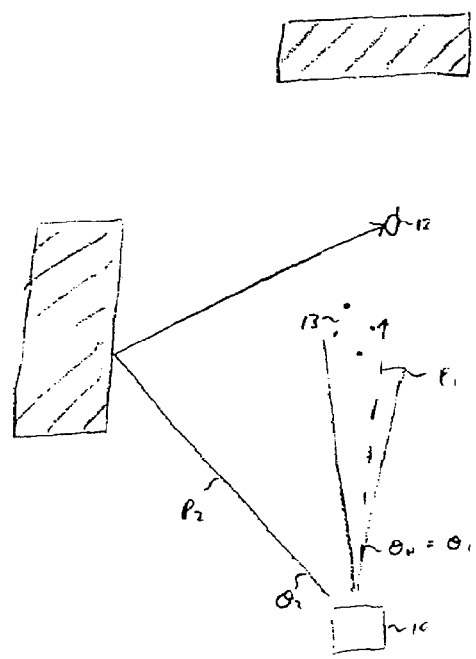

FIG. 14 illustrate how the situations shown in FIG. 13 might arise in practice. In FIG. 14, transmission path $P_1$ is a direct transmission path from base station 10 to mobile unit 12, transmission path $P_2$ is a reflected transmission path from base station 10 to mobile unit 12, and a group of users 13 form a traffic hot spot. It can be seen that in FIG. 14(*a*) neither $P_1$ nor $P_2$ interferes with the group of users 13 in the traffic hot spot, while in FIG. 14(*b*) transmission path $P_1$, if active, would cause interference to the users in the traffic hot spot.

As an alternative to transmitter power density profiles, estimated downlink normalised load profiles may be used.

The various steps described above are repeated cyclically, so that the path diversity controller 240 continually monitors the transmission paths that exist between the base station and the mobile unit, and allocates path processors as appropriate.

Fourth Embodiment

In communications systems which utilise code division multiple access (CDMA), each transmission channel is allocated an appropriate spreading code which is used to spread the transmission signal to a multiple of its original bandwidth. The signals obtained in this way are sent simultaneously in the same frequency band. Each receiver synchronises itself with one of the coded transmission signals using an autocorrelation function, which correlates a replica of the spreading code with the received signal. CDMA is therefore referred to as self synchronising.

Interference between the various transmission signals can be minimised through the use of orthogonal spreading codes. As long as the various transmission signals remain in time synchronism with each other, then the orthogonality between the spreading codes will be maintained. However, if time synchronism is lost, for example because two transmission signals arrive at the same mobile unit via different transmission paths with different lengths, then orthogonality may be lost, which may lead to increased interference between those signals.

In a fourth embodiment of a communications system, a time advance is selectively applied to certain transmission signals so that different transmission signals transmitted via different transmission paths arrive at a mobile unit in approximate time synchronism. In this way orthogonality between the transmission signals can be maintained, which reduces the interference between the signals. The fourth embodiment may be provided independently or in combination with any of the first to third embodiments.

For example, if two transmission paths exist between the base station and the mobile unit, then it might be decided to time advance the transmission signal transmitted via the longer transmission path so that each of the transmission signals arrives at the mobile unit in time synchronism. In this case different spreading (and/or scrambling) codes are used for the two transmission signals, so that the mobile unit can separate the transmission signals transmitted via the different transmission paths. Since the spreading codes are chosen to be orthogonal, by ensuring that the transmission signals transmitted via the two transmission paths arrive in time synchronism, interference between the signals is minimised. This can allow the quality of the received signal to be improved without increasing the transmitted power, or the transmitted power to be reduced.

Alternatively, where there is a group of users forming a traffic hot spot, and a transmission path of a high data rate user passes through that traffic hot spot, the transmission signal of the high data rate user may be time advanced so that that signal arrives at the traffic hot spot in time synchronism with the transmission signals of the users in the hot spot. This improves the orthogonality of the high data rate signal with the signals of the users in the traffic hot spot, thus improving the signal-to-interference ratio in that area.

In general, selective time advance allows interference conditions in a selected region to be improved, but not the interference conditions in the whole area of coverage. Thus selective time advance may be used in particular in situations where significant interference is likely to occur, such as in a traffic hot spot or where a high data rate signal is transmitted. This may improve the overall performance of the system.

Figure 15:
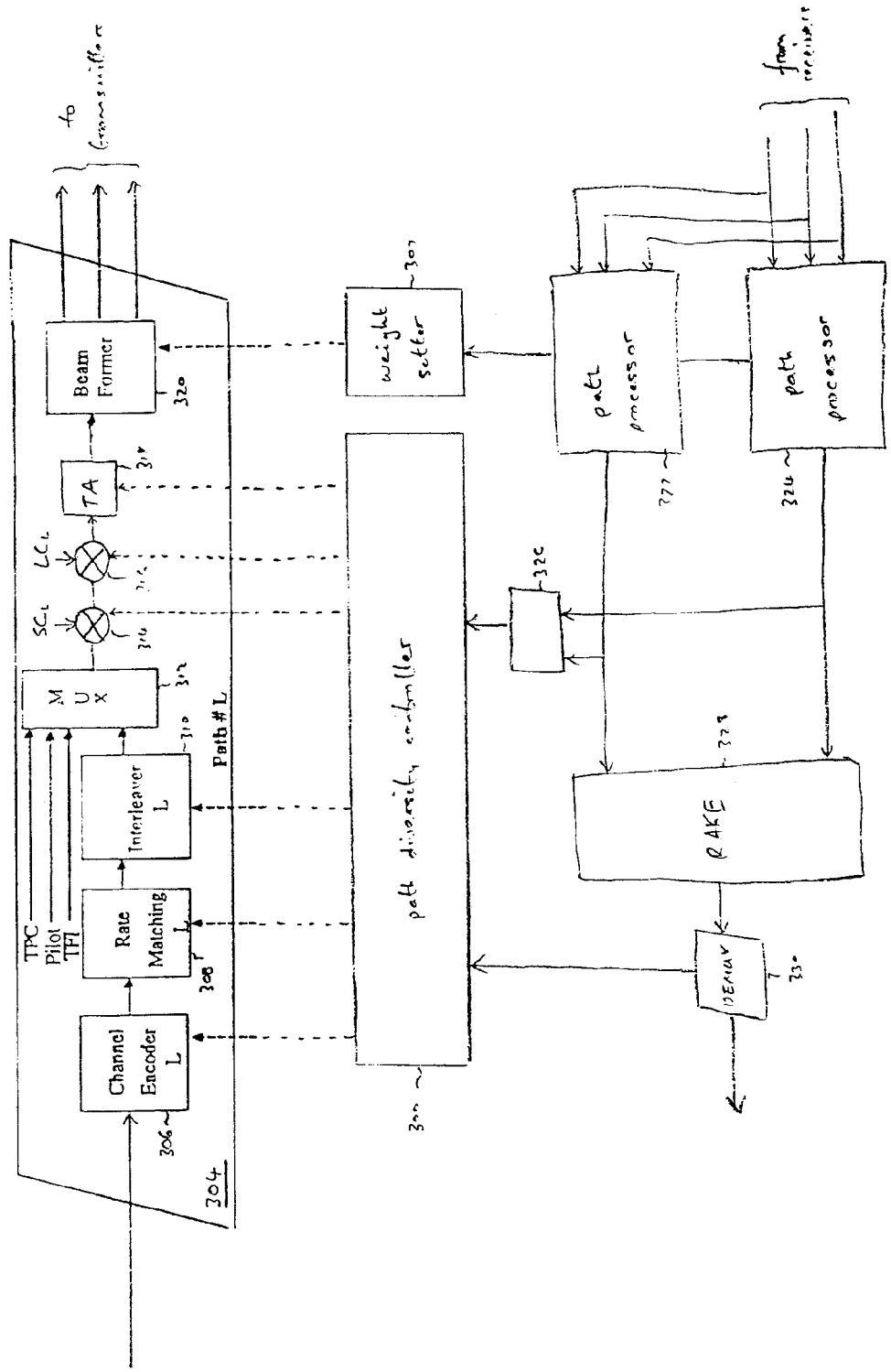
FIG. 15 is a block diagram of parts of a base station in a fourth embodiment of a communications system.

FIG. 15 shows parts of a base station according to the fourth embodiment. The base station comprises path diversity controller 300, weight setter 302, transmit path processor 304, receive path processors 322, 324, time difference measurement unit 326, RAKE combiner 328 and demultiplexer 330. Path processors 322, 324, RAKE combiner 328 and demultiplexer 330 have the same functions as the corresponding parts described above with reference to FIG. 10, and thus these parts will not be described further.

Path processor 304 comprises channel encoder 306, rate matcher 308, interleaver 310, multiplexer 312, spreader 314, scrambler 316, time advance (TA) unit 318 and beam former 320. Path processor 304 is for processing the signals to be transmitted to a mobile unit via a particular transmission path. Other path processors (not shown) are provided for processing the signals to be transmitted to the mobile unit via other transmission paths. Channel encoder 306, rate matcher 308, interleaver 310, multiplexer 312, spreader 314, scrambler 316 and beam former 320 have the same functions as the corresponding parts described in the first and second embodiments and thus these parts will not be described further. The path processor 304 may be one of path processors 104, 106, 108 in FIG. 7, or one of path processors 60, 62 in FIG. 4. In the latter case the channel encoder 306, rate matcher 308 and interleaver 310 are omitted.

In operation, the time advance unit 318 selectively time advances certain transmission paths under control of path diversity controller 300 so as to improve the overall performance of the system. In one example, the path diversity controller 300 monitors the transmitter power density profile to identify any traffic hot spots. If there is a traffic hot spot, then the time advance unit 318 time advances certain transmission signals so that they arrive at the traffic hot spot substantially in time synchronism with other transmission signals. High data rate signals are generally selected for time advance, since these are likely to cause the most interference to other transmission signals.

In another example, the path diversity controller 300 monitors the transmission directions of the various transmission beams to identify any high data rate transmission signals which are sent to a mobile unit via two or more different transmission paths. In this case some of the transmission signals sent via the various transmission paths can be time advanced such that the various transmission signals arrive at the mobile unit substantially in time synchronism. In this way, the quality of the signals received by the mobile unit can be improved without increasing the transmitter power.

In order to apply the appropriate time advance to a transmission signal, the difference in the propagation time to the mobile unit of that transmission signal and the transmission signal to which it is to be time synchronised is measured. In one implementation this is done by measuring the time difference between signals received by the base station via corresponding reception paths. Time difference measurement unit 326 measures the time differences between the received signals processed by path processors 322, 324 and supplies the measured time difference to path diversity controller 300. Path diversity controller 300 then controls the appropriate time advance unit 318 to apply a time advance equal to the measured time difference. Alternatively, the time difference between the signals may be measured by RAKE combiner 218 to enable the signals to be combined, and this information may be made available to the path diversity controller.

In other implementation, the time differences between transmission signals arriving at a mobile unit via different transmission paths are measured by the mobile unit, and the measure of the time difference is sent back to the base station, for example, in response to a request from the base station. For example, where a signal is sent to a mobile unit via two different transmission paths, the mobile unit may measure the difference in arrival time of the two transmission signals and send the information back to the base station. In another example, where the mobile unit is experiencing interference from the transmission signal of another (high data rate) user, which transmission signal arrives via a different transmission path, the mobile unit may measure the time difference between its own transmission signal and the interfering transmission signal and send this information back to the base station. The base station may then adjust the timing of one or more of the transmission signals so that the signals arrive at the mobile unit substantially in time synchronism.

Figure 16:
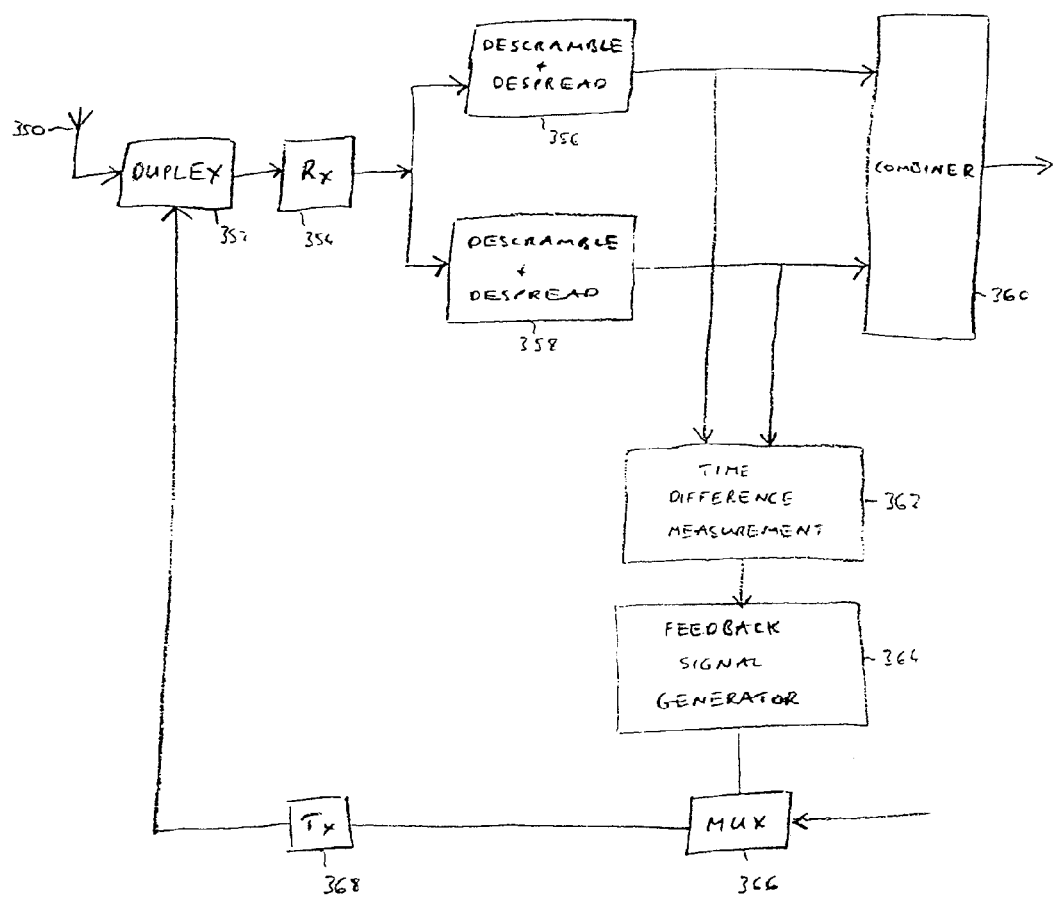
FIG. 16 is a block diagram of parts of a mobile unit in the fourth embodiment.

Parts of a mobile unit which may be used in the fourth embodiment are shown in FIG. 16. The mobile unit comprises antenna 350, duplexer 352, receiver 354, descramblers/despreaders 356, 358, combiner 360, time difference measurement unit 362, feedback signal generator 364, multiplexer 366 and transmitter 368. In operation, transmission beams from the base station are received by antenna 350 and passed to duplexer 352, which separates received and transmitted signals. The radio frequency signals received by antenna 350 are passed to receiver 354, which down-converts the signals and digitizes the down-converted signals. Each of the despreaders/descramblers 356, 358 then despreads and/or descrambles a signal which has been spread or scrambled with a particular spreading or scrambling code and which has been received via a particular transmission path. The descramblers/despreaders 356, 358 may for example comprise descramblers, despreaders and integrators similar to those shown in FIGS. 6 and 9. The despread and descrambled signals are then combined in combiner 360.

The difference in the propagation time of the two transmission signals is measured in time difference measurement unit 362. This is done by measuring the time difference between a corresponding part of the two signals. The time difference is fed to feedback signal generator 364, which generates a feedback signal based on the time difference. The feedback signal is fed to multiplexer 366 for insertion into the signal for transmission from the mobile unit to the base station. For example, the frame format shown in FIG. 3 may be used, and the feedback signal may be sent using the feedback information bits FBI. At the base station the feedback signal is extracted by the demultiplexer 330 in FIG. 15.

In another implementation, a separate apparatus, other than a mobile unit, is used to measure the relative propagation delay and to feed this information back to the base station. Such an apparatus may be permanently located in an area which is likely to be a traffic hot spot, such as a shopping mall or an office building.

Examples of the operation of the fourth embodiment will now be described referring to FIG. 17. In the situation shown in FIG. 17(a) a high data rate user 12 has two transmission paths $P_1$ and $P_2$ in directions $\theta_1$ and $\theta_2$ respectively. In this case, neither of $P_1$ or $P_2$ are in the direction of the traffic hot spot. The difference in the propagation times of transmission paths $P_1$ and $P_2$ is measured, and a time advance equal to the time difference is applied to the transmission signal transmitted via the longest path (P$_2$). Thus the transmission signals transmitted to the high data rate user 12 via P$_1$ and P$_2$ arrive in time synchronism, which minimises the interference between the signals.

Figure 17:
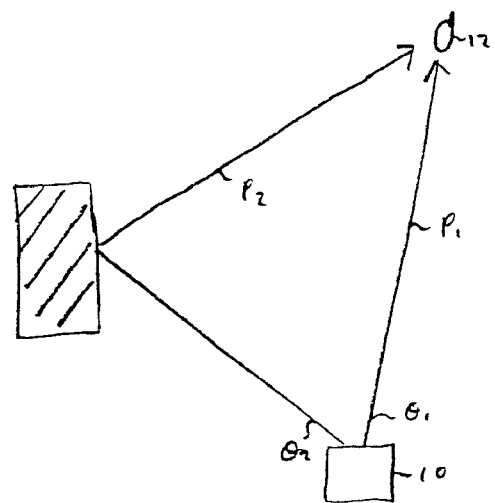
FIG. 17 show further examples of transmission paths from a base station to a mobile unit.
Figure 17:
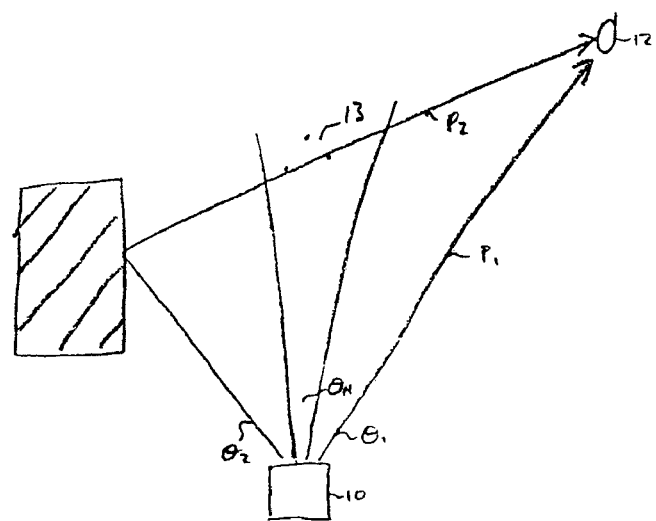

In the situation shown FIG. 17(*b*), the transmission path P2 crosses a group of users 13 in a traffic hot spot. The signal transmitted via path P$_2$ arrives via an indirect path at the traffic hot spot, and thus orthogonality is lost between that signal and the signals which are transmitted directly to the users 13 in the hot spot. In this case, to reduce the interference caused to the users in the traffic hot spot, the signal transmitted via path P$_2$ is time advanced so that it arrives at the traffic hot spot in time synchronism with the signals transmitted directly to the mobile units in the traffic hot spot. To achieve this, the time difference T$_d$ between the propagation time of signals transmitted directly to the traffic hot spot, and the propagation time of the signal transmitted via P$_2$ to the hot spot, is measured. This may be done, for example, by one of the mobile units in the group of mobile units 13, or by some other apparatus which is located at the traffic hot spot, and the time difference fed back to the base station. The base station then applies a time advance equal to T$_d$ to the signal transmitted via the path P$_2$. If desired, the average of the time difference T$_d$ for a group of users may be used. In this way, the orthogonality between the various signals can be maintained in the traffic hot spot, thereby reducing the interference between the signals in the hot spot, which in turn may allow lower transmission powers to be used.

Thus it can be seen that selective time advance may be used to reduce interference and/or transmission power in traffic hot spots, which are those areas where interference and high transmission power are most problematic.

As an alternative to selectively time advancing the transmission signals transmitted via certain transmission paths, the transmission signals transmitted via other transmission paths could be selectively time delayed to achieve orthogonality between the transmission signals, or a combination of time advance and time delay could be used.

The various embodiments which have been described above are typically implemented using software modules running on a processor, for example a digital signal processor. The programming of such modules will be apparent to the skilled person from the description of the various functions. The skilled person will appreciate that such modules may be programmed on any appropriate processor using any appropriate programming language. Alternatively, some or all of the functions described above may be implemented using dedicated hardware.

The invention is not limited to use with cellular mobile communications systems, but may be applied to any communications system where two or more transmission paths exist between a transmitter and a receiver. The invention may be used with multiplexing techniques other than CDMA, such as Time Division Multiple Access (TDMA), Frequency Division Multiplexing (FDM), Time Division Duplexing (whether spread or not), Space Division Multiple Access (SDMA) or any other appropriate multiplexing technique.

It will be understood that the present invention has been described above purely by way of example, and modifications of detail can be made within the scope of the invention.

Each feature disclosed in the description, and (where appropriate) the claims and drawings may be provided independently or in any appropriate combination.

The invention claimed is:

1. A receiving apparatus, comprising:
   a receiving unit operable to receive a first signal corresponding to first data and a second signal corresponding to second data from a transmitting apparatus via different transmission paths, wherein the first data and the second data are channel encoded separately and are spread by using a common spreading code before transforming into the first signal and the second signal;
   a channel decoding part operable to execute channel decoding process separately for the first and the second signal received by the receiving unit to obtain the first data and the second data,
   wherein the transmitting apparatus has a plurality of antennas and weights are assigned to the first signal and the second signal before being provided to the plurality of antennas.

2. The receiving apparatus according to claim 1 further comprising a data combining unit to combine the first data and the second data obtained by the channel decoding part.

3. The receiving apparatus according to claim 1, wherein the first data and the second data are processed separately by rate-matching process before transforming into the first signal and the second signal.

4. The receiving apparatus according to claim 1, wherein the first data and the second data are processed separately by interleaving process before transforming into the first signal and the second signal.

5. A transmitting apparatus compromising:
   a channel encoding part operable to channel encode first data and second data separately to obtain first encoded data and second encoded data;
   a spreading part operable to spread the first encoded data and the second encoded data by a common spreading code to obtain a first spread data and a second spread data; and
   a transmitter operable to transmit a first signal corresponding to the first spread data and a second signal corresponding to the second spread data via different transmission paths,
   wherein the transmitter has a plurality of antennas, the first signal and the second signal are transmitted by the plurality of antennas, and weights are assigned to the first signal and the second signal before being provided to the plurality of antennas.

6. The transmitting apparatus according to claim 5, wherein the first encoded data and the second encoded data are processed separately by rate-matching process before transforming into the first signal and the second signal.

7. The transmitting apparatus according to claim 5, wherein the first encoded data and the second encoded data are processed separately by interleaving process before transforming into the first signal and the second signal.

* * * * *